US008122023B2

(12) United States Patent
Lewak et al.

(10) Patent No.: US 8,122,023 B2
(45) Date of Patent: Feb. 21, 2012

(54) DATA ACCESS USING MULTILEVEL SELECTORS AND CONTEXTUAL ASSISTANCE

(75) Inventors: Jerzy Jozef Lewak, Del Mar, CA (US); Miles Kevin Yano, Yorba Linda, CA (US); Tim Pevzner, Escondido, CA (US)

(73) Assignee: Speedtrack, Inc., Del Mar, CA (US)

( * ) Notice: Subject to any disclaimer, the term of this patent is extended or adjusted under 35 U.S.C. 154(b) by 718 days.

(21) Appl. No.: 12/223,275

(22) PCT Filed: Jan. 25, 2007

(86) PCT No.: PCT/US2007/001986
§ 371 (c)(1),
(2), (4) Date: Jul. 25, 2008

(87) PCT Pub. No.: WO2007/087379
PCT Pub. Date: Aug. 2, 2007

(65) Prior Publication Data
US 2010/0241649 A1    Sep. 23, 2010

Related U.S. Application Data

(60) Provisional application No. 60/762,255, filed on Jan. 25, 2006.

(51) Int. Cl.
*G06F 17/30* (2006.01)
(52) U.S. Cl. .................................. 707/736; 707/798
(58) Field of Classification Search .................. 707/736, 707/767, 805, 798
See application file for complete search history.

(56) References Cited

U.S. PATENT DOCUMENTS

| 7,716,244 | B2 * | 5/2010 | Abrams et al. | 707/785 |
|---|---|---|---|---|
| 2003/0195873 | A1 * | 10/2003 | Lewak et al. | 707/3 |
| 2005/0038533 | A1 * | 2/2005 | Farrell et al. | 700/73 |
| 2005/0049994 | A1 * | 3/2005 | Thompson et al. | 707/1 |
| 2007/0055657 | A1 * | 3/2007 | Yano | 707/3 |
| 2010/0100546 | A1 * | 4/2010 | Kohler | 707/739 |

OTHER PUBLICATIONS

Vo, Cecile, International Search Report received from ISA/US PTO dated Jun. 17, 2008 for related PCT appln. No. PCT/US2007/001986, 3 pgs.
Vo, Cecile, Written Opinion of the International Searching Authority received from ISA/US PTO dated Jun. 17, 2008 for related PCT appln. No. PCT/US2007/001986, 8 pgs.

* cited by examiner

*Primary Examiner* — James Trujillo
*Assistant Examiner* — Sohelia Davanlou

(57) ABSTRACT

A method and system to derive association-explicit metadata, about a target data collection, that is useful to facilitate access and searching of the data collection, regardless of the organizational structure of the collection. The metadata may be generated to comprise DetailSelectors describing lowest level data elements; groups thereof that provide context for member DetailSelectors, plus Boolean properties for queries using such Selectors, and association links to higher-level GlueSelectors that comprise such DetailSelectors, as well as association links to yet higher levels, eventually to Items, which are of a level greater than the highest level GlueSelector, reference a predetermined collection of data in the target collection, and comprise suitable matches for all of the DetailSelectors represented. Such metadata may be used to present choices to a user for terms to add to a query while ensuring suitable match by information in at least one Item. Information about Groups of DetailSelectors and Groups of GlueSelectors, as well as information about content of a GlueSelector, may be presented to a user to reduce in the query and in the data thus located.

25 Claims, 1 Drawing Sheet

DATA ACCESS USING MULTILEVEL SELECTORS AND CONTEXTUAL ASSISTANCE

CROSS REFERENCE TO RELATED APPLICATIONS

This application is a national stage completion in the United States of International Application No. PCT/US2007/001986 filed Jan. 25, 2007 and entitled "Data Access Using Multilevel Selectors and Contextual Assistance", claims priority to U.S. Provisional Application 60/762,255, filed Jan. 25, 2006 and entitled "Method and System Extending the TIE Database System Using Multiple Selector (Facet) Layers and other Techniques," and is related to commonly owned application Ser. No. 10/969,131 entitled "Identifier Vocabulary Data Access Method and System," filed Oct. 19, 2004, which is a continuation of identically entitled application Ser. No. 10/345,093 filed Jan. 14, 2003, now U.S. Pat. No. 6,826,566 issued Nov. 30, 2004, which in turn claims the benefit under 35 USC 119 of U.S. Provisional Application No. 60/348,616, entitled "New Database Design Using Language Based Category Identifiers and Their Association with Data," filed Jan. 14, 2002, and is also related to U.S. Pat. No. 5,544,360 entitled "Method for Accessing Computer Files And Data, Using Linked Categories Assigned to Each Data File Record On Entry of the Data File Record," issued Aug. 6, 1996; and all of the above-identified U.S. patent documents are hereby incorporated herein in their entireties by reference.

BACKGROUND

1. Field

This application generally relates to the field of information technology, and more particularly to systems and methods for data management, search and selection:

2. Related Art

The volume of stored data in our increasingly computerized and networked world continues to grow rapidly, perhaps exponentially. Consequently, the usefulness of methods for searching and data management can hardly be exaggerated. Data is collected and sorted or searched for consumer purchase decisions, law enforcement investigations, and scientific research, to mention just a few examples. All of these can benefit from employment of the methods and systems that follow the teaching herein.

The above identified U.S. Pat. Nos. 5,544,360 ("the '360 patent") and 6,826,566 ("the '566 patent") describe technology employed in database management systems that may be referred to as TIE (for Technology for Information Engineering™, a trademark of Speedtrack, Inc.) systems or software. The term TIE system does not refer only to software, methods or a system that has been actually implemented by Speedtrack, Inc., or by others, but rather refers to any software, method or system that is consistent with the teaching that is set forth explicitly, or is incorporated in this document by reference to either the '360 patent or the '566 patent.

The subject matter of the '360 and '566 patents includes a method of identifying and retrieving DataItems by means of a guided search, in which the user is presented with Selectors (corresponding to ItemSelectors in the '566 patent and Categories in the '360 patent) that are currently available to be chosen by the user to further limit the range of DataItems specified by the search. An important effect of the described search method is that upon choosing an available Selector, the user is guaranteed to be identifying at least one DataItem, which can then be retrieved. Development of an appropriate vocabulary of Selectors permits a user to access data located anywhere in a database based on its content, by means of a Selector-based, non-hierarchical, guided search.

Depending on the exact implementation of a TIE data access system, ambiguities can arise that impair the effectiveness of searches. One important source of ambiguity is caused by confusion between Subitems within a DataItem. A police incident report may serve as a DataItem. Any particular incident report is likely to have a plurality of some type of Subitem. For example, a report of an auto accident may include three vehicles and their drivers. If one vehicle is a red 4-door sedan Toyota Corolla, another is a white pickup Ford Ranger, and the third is a green minivan Dodge Caravan, it is easy to see that the overall DataItem would appear to match a "green vehicle 4-door sedan Ford." Many approaches are possible to overcome this sort of ambiguity, several of which are described herein.

A second important source of ambiguity arises not from conflation of information in DataItems, but from the difficulty of identifying sufficient context to lead a user to useful results. In this case, the lack of context renders the search terms ambiguous. "Red" or even "bright red" may refer to clothes, cars, faces, planets, stars, lasers, blood, animals such as frogs or snakes, etc. To reduce the ambiguity, context is needed. Yet such context is likely to be described differently by different people, making it difficult for people to describe, and difficult for computers to identify, the intended context.

Clearly, improved techniques for organizing and searching data are needed, for example to reduce the ambiguity that may result from many current search and data management techniques. Methods and systems that address these needs, and provide further benefit, are described herein.

SUMMARY

A method and system having features suitable for use with many information management systems to improve the accessibility of target data through innovative methods of deriving and employing metadata that describes aspects of the target data, together with relationships between and within elements of the target data.

One embodiment is a method of generating metadata about a data collection with explicit associations to facilitate subsequent access to data of collection. It includes identifying Information Details, and generating for each a Level-1 DetailSelector that references it, and identifying a multiplicity of the Information Details that are contextually related due to each describing a common Subitem. It further includes generating an association link from each DetailSelector corresponding to the contextually related Information Details to a Level-2 GlueSelector, which thereby reflects the contextual relationship of the multiplicity of Information Details. Further Level-N GlueSelectors may be generated to comprise association links from themselves to one or more lower level Selectors that are contextually related due to each being descriptive of another Subitem, and the method includes generating an association link between any GlueSelector and an Item that represents a set of related data within the collection, and includes Information Details suitably matching the contextual meaning represented by the particular GlueSelector. Using standard Graph Theory terminology, the association links, together with the Selectors and Items they associate, can be represented as a K-partite simple Graph having at least one cycle, where each partite set contains all vertices representing one level of Selectors or Items, each association link is a Graph Edge, and Items are Level K, which is one plus the highest Selector level.

Another embodiment is a method of using metadata about a data collection to facilitate access to predefined DataItems that comprise a plurality of associated constituent DataDetails in the collection. The metadata includes Level-1 DetailSelectors, each referencing a particular Information Detail of the collection, plus Level-N GlueSelectors that are each represented by a GlueID and comprising association links from themselves to a plurality of lower-level Selectors, and that each represent all the DetailSelectors that are represented by the lower-level Selectors or have an association link to the Level-N GlueSelector, where all the represented DetailSelectors are contextually related due to describing a same Subitem within a DataItem. The metadata must also include a plurality of Items that each reference a corresponding DataItem and indicate association links to one or more GlueSelectors, thereby reflecting that the DataItem includes Information Details suitably matching those represented by the Level-N GlueSelectors. Using standard Graph Theory terminology, the association links together with the Selectors and Items they associate can be represented as a K-partite simple Graph having at least one cycle, where each partite set consists of all vertices representing a solitary level of Selectors or Items, each association link is a Graph Edge, and Items are Level-K, which is one plus the highest Selector level. The method of using such metadata includes accepting a user-indicated Information Detail as a term for a current search query, then using the metadata to determine in response a set of information Details, any one of which if added to the current query would form a new search query that suitably matches at least one DataItem, and offering some of the set of Information Details as choices for the user to add to the current search query.

A further embodiment is a computer system, having memory and processing capability, which is configured to perform the steps of either of the embodiments described above.

MODES OF CARRYING OUT THE INVENTION

Figure 1:
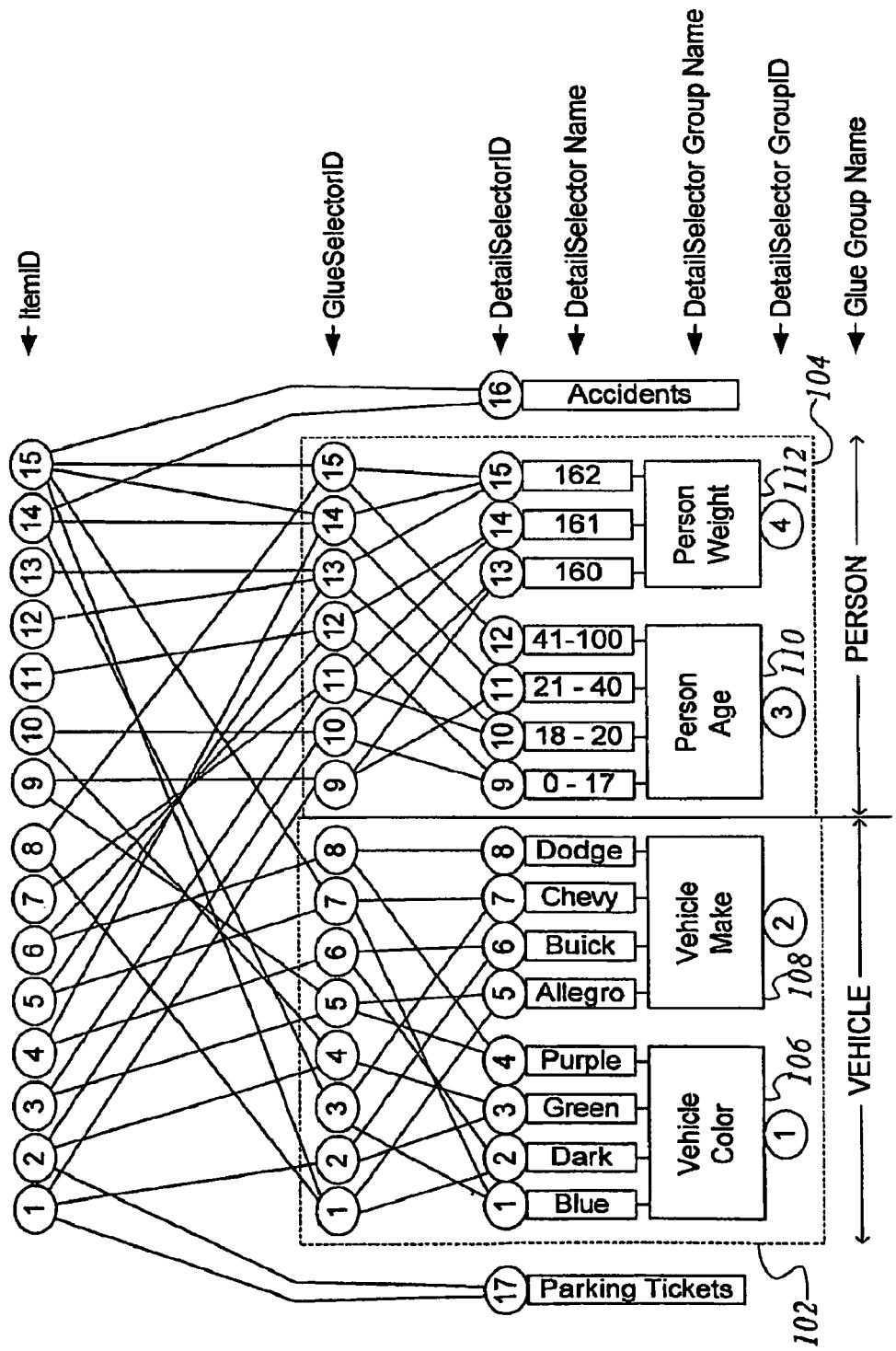
FIG. 1 illustrates IM system concepts by illustrating elements and interconnections for a highly simplified IM system.

The Information Management (IM) method and system described herein provides a mechanism for searching for particular information within a collection of data, which may be very large. This IM method derives metadata—data about the information in the data collection—generating it from the data collection by preprocessing the data. The techniques may be used for fast and effective web searches, for example, insofar as the web pages have been preprocessed, or are analyzed during the search. In a controlled database where preprocessing can be assured, desired information can be quickly accessed regardless of the organizational structure (or lack thereof) of the database.

These IM methods and systems extend the TIE (Technology for Information Engineering™) systems that are described in related U.S. Pat. Nos. 5,544,360 ("the '360 patent") and 6,826,566 ("the '566 patent"). They have been developed primarily to resolve data ambiguities that can arise, not only in earlier TIE systems, but in any IM system. In solving issues of data ambiguity, the described method and system will in most instances have other benefits, such as increasing the effectiveness and speed of data access, and improving the ease with which a user can cull truly desirable information from a large quantity of information that seems to match that which is desired.

TERMINOLOGY: The IM system and method will be best understood in view of the following definitions of unique terms, terms of art, and specially-used common terms:

TIE System: a general reference to a system or method as described in the '360 and/or '566 patents. Sometimes used broadly to describe a system developed by groups including some of the inventors, such as the IM system described herein.

IM System: a system or method of Information Management that includes features not described in the '360 or '566 patents, but described herein. A FACTS system is one type of IM system.

DATA:

Data Collection: also "target data collection," a typically large set of data, however organized, defined as the subject or target of the IM system for user access or for generating descriptive metadata.

DataItem: information within the target data collection that is defined to be treated as a target for access. The information a data item comprises need not be located in any particular file, field, record, or hierarchical directory structure, but may be in a variety of different places that are effectively referenced by the corresponding ItemID.

ItemID: a name, other reference, or preferably a simple number that is sufficient, in context, to access all of the metadata comprised by the corresponding Item, and to identify and access the corresponding DataItem within the target data collection. It may be simply a name corresponding to a file or record that in turn comprises the relevant Item information.

Item: a collection of metadata used by the IM system to reference, locate and access its corresponding DataItem. It may identify association links to Selectors, locations of DataItem constituent information, a descriptive name, and any other relevant information that is referenced by its ItemID. This term may be synonymous with Item, ItemID and/or DataItem when (as is often the case) the distinctions between them are not germane to the context in which it is used.

Subitem: an object or other conceptually related entity comprised by a DataItem, including facets or aspects that are described by all of the Details associatively linked to a particular GlueSelector.

Facet: an aspect of an Item or Subitem that is capable of description by one or more of the DetailSelectors associatively coupled to the containing Item; an identifiable descriptive subelement. It is particularly used to mean the contextual description. For example, the facet "Kitchen Appliances" describes the context of the target "Dishwasher," whereas if the facet was different, for example "Catering Services," the meaning of "Dishwasher" would be quite different.

Information Detail: a lowest level of information, within at least one DataItem of the target data collection, which may be selected by the user, in a particular search context, to query, search and access a DataItem in the target data collection. Though typically a word or phrase, an Information Detail may also be an element of video or audio or other specifically identifiable data element. In some contexts may be a letter, or even a portion of a letter, an image or portion, a fingerprint, etc. It is defined by its use in the IM system, and may be user or administrator controllable to establish the particular data content to be treated as such lowest selectable portion in the context of metadata construction, or of a particular search or access process.

Detail: a general reference to any of an Information Detail, a DetailSelector, or a DetailSelectorID, when the distinction is unimportant or is clear from context.

SELECTORS:

SelectorID: A SelectorID is a number, name, or other identifier that permits reference to metadata that is effectively comprised by a corresponding Selector, such as any up or down association links from the particular Selector, a Selector name, and membership of the Selector in one or more Groups. In a preferred embodiment, it is a single number that serves as a pointer into various tables that reflect the associations and other metadata, but may be any name, number or other information that can serve as a reference. It may be simply a name of a file or record comprising the information encompassed by its Selector.

Selector: Metadata that effectively comprises (typically by reference through a corresponding SelectorID) information defining the associative linking of the Selector to other entities, such as DataDetails, DataItems, other Selectors, a descriptive name, a referential name or ID, and membership in Groups, though such information may typically be disposed in different locations. Particular Selectors are chosen by a user during query formulation, in which context the term may be applied synonymously to the actual information presented to or received from the user that serves to indicate such Selector. To be useful as a user-selectable entity, each Selector should be associatively linked to at least one Item, and to at least one Detail.

DetailSelector/ID: a DetailSelector is a lowest level Selector that is selectable by a user in a particular context, and is associatively linked only to higher level entities. A DetailSelector corresponds directly (without further intermediate Selectors) to one or more suitably matching Information Details within a target data collection. The DetailSelectorID is a reference that corresponds one-to-one with a DetailSelector in the same manner as any SelectorID corresponds to a Selector, such that the two terms may be used interchangeably for many purposes.

BareSelector/ID: a BareSelector is a DetailSelector having no association links to any other Selector, but associatively linked only to one or more suitably matching Information Details, and to one or more Items. It may effectively identify a class or type of Items. It effectively comprises information about its associations, name, and group memberships as does any Selector. The corresponding BareSelectorID is related to it as any SelectorID is related to its corresponding Selector.

GlueSelector/ID: a GlueSelector is an intermediate Selector that holds together a plurality of lower-level Selectors with each of which it has an association link, such that it Is associatively linked down to at least one DetailSelector. It may also have association links to higher level GlueSelectors, and/or to Items, and should be associatively linked up to at least one Item. A GlueSelectorID has the same relationship to its corresponding GlueSelector as any SelectorID has to its corresponding Selector.

Selector Level: a piece of information about a Selector that is very useful for description and understanding of association links via such Selector. However, while information that is effectively comprised by a Selector should explicitly identify each existing "up" or "down" association link of such Selector, the Level need not exist explicitly in the metadata. However, a Level-1 Selector is a DetailSelector, and a Selector Level is defined recursively from the DetailSelector by the relationship that a Level-N Selector is directly associated with Selectors at Levels<N with at least one association to a Selector at Level N-1.

Selector Groups: an association between member Selectors that conveys contextual information. All member Selectors constitute partial descriptions of one or another Subitems, and the Selector Group membership reflects a concept common to the Subitems which the member Selectors describe.

ELEMENT ASSOCIATIONS:

Association link: a direct link between two entities with no intervening entities along the linking path. It is expressly defined in the metadata, though the expression may be indirect, such as through the use of tables relating the IDs of the two entities. Using Graph Theory terminology, in an Association Graph two entities that share an association link are represented as adjacent vertices.

Available Items and Selectors: "Available" in that if they are effectively selected to add to a current query, the resulting query will match at least one Item. Evaluation of a current query, including Boolean operator effects within Groups of DetailSelectors and following Association Links at least monotonically from the DetailSelectors leads to one or more Items that comprise data suitably matching the current query. Such set of matching Items may be referred to as "Filter Items," and is the set of Items that is "available" for further matches. Traversing the association links monotonically down from the Filter Items, each encountered GlueSelector is "available" (except if within a previously chosen group of GlueSelectors, in which case the intersection of the previously chosen selectors limits those reached from a higher level entity via association links), as is each lower level Selector with an association link to such available GlueSelector. Recursively, and allowing for Boolean effects, this leads to a set of DetailSelectors that are "available" to be added to the current query without causing it to match the null set.

Up/Down (association links): "Up" is a direction of traversing an association link from a lower level to a higher level, and "Down" is a direction of traversing an association link from a higher level to a lower level. Up and Down may also be used more generally to indicate whether, compared to a reference level, an entity is of higher level (up) or lower (down) level, irrespective of any actual association linking.

Monotonic linking: It will sometimes be useful to define linking between Items and Details that traverses multiple association links. If two entities (vertices) are connected by an association link, then they are "associated;" moreover, any two entities that are joined by an unbroken string of association links are also in some sense "associated." It is sometimes useful to limit the associations of interest to those in which a path along association links from a first entity to a second entity traverses each successive association link in the same "direction," i.e., always from higher levels to lower levels (e.g., for a link from Item to Detail), or always from a lower level to a higher level (e.g., for a link from a Detail to an Item). An association is by monotonic linking if and only if each association link (or graph edge) that is traversed to get from a higher level entity (e.g., an Item) to a lower level entity (e.g., a Detail) traverses each successive association link in the same direction, from higher level to lower level. Association links are bidirectional, so the converse is also true. That is, for a Detail (lowest level) that is monotonically linked to an Item (highest level), one can traverse association paths always in the same direction, from a lower level to a higher level. Indeed, if two entities are monotonically linked "up," they generally must also be monotonically linked down, unless they are traversing an association link that is somehow ma bidirectional. The fact that two entities are monotonically linked does not preclude their association links from being bidirectional, nor preclude the possibility that a graph cycle may provide an alternative, non-monotonic path between the entities. Rather, monotonic linking merely requires that association paths exist such that one may traverse a series of association paths to get from a first entity to a second entity without changing the direction of traversal, i.e., it requires that a path can be traversed between the entities by always going "up" to a higher level, or by always going "down" to a lower level.

GRAPH THEORY:

Graph: In a mathematician's terminology, a graph is a collection of points (vertices) with lines (edges) connecting some (possibly empty) subset of them. Vertices may also be called "nodes" or simply "points." Graph edges, may also be called "arcs" or "lines." An Association Graph, as used herein, is a graph in which Selectors and Items are vertices, and association links are graph edges.

Simple Graph: A simple graph, also called a strict graph, is an unweighted, undirected graph containing no graph loops (edges that extend from a vertex and return to the same vertex without traversing a different vertex) or multiple edges (a plurality of different edges directly connecting the same two vertices).

Graph Cycle: A cycle of a graph, sometimes also called a circuit, is a subset of the edge set (set of all graph edges) that forms a path such that the first node of the path corresponds to the last. The length of the cycle is the number of edges in the cycle. A cycle with only one edge is a loop, which does not exist in a simple graph.

Triangle-free graph: A graph containing no cycles of length three is called a triangle-free graph.

K-partite graph: A graph whose graph vertices can be partitioned into k disjoint sets so that no two vertices within the same set are adjacent. These sets are called the partite sets.

Vertex: A point or node on a graph that may join a plurality of edges that are connected to it.

Edge: A line between graph vertices. As used herein, an edge represents an association link between the entities represented by the connected vertices.

Hierarchical directory structure: A hierarchical directory structure makes associations between lower-level nodes (files) and higher-level nodes (directories), up to a root directory; when described in a graph, a hierarchical directory structure cannot have Graph Cycles.

CONVENTIONS: In a system that creates metadata to reflect, describe, reference and access actual information in a data collection, oftentimes one reference is for all relevant intents and purposes the same as the thing that it represents. In some contexts the difference between a DetailSelector and the corresponding Information Detail that it references may not need to be specified, either because it is apparent, or because it is of no consequence. Consequently, in some instances pairs of terms such as Information Detail and DetailSelector, DataItem and ItemID, GlueSelector and GlueSelectorID, or even TIE system and IM system, are used interchangeably. To alleviate the confusion of such informal referencing, the following conventions are adopted.

The term "DetailSelector" is preferred for somewhat informal reference when the subject may be a DetailSelector, the Information Detail it represents, and/or a DetailSelectorID; however, "Detail" may also be used. Similarly, "Item" is preferred to mean ItemID, the DataItem to which the ItemID refers, or the Item or content thereof. Capitalization generally indicates a term having a special meaning and definition herein. Capitalized word combinations are generally defined in the Terminology section. A system that is consistent with IM system features described herein is an IM system, but most IM implementations have many features in common with TIE systems. IM system refers to any of a physical system, a system of Information Management, or a method of Information Management. When conformance to the conventions set forth above lags, judicious interpretation of informalities may be required.

BASIC TIE SYSTEM: The method and system described herein is applicable to a wide range of data collections, ranging from a few fields in a single file, to large databases having numerous files, to the huge amount of data available on the Internet. However, it has been developed in the particular context of Technology for Information Engineering™ (TIE) systems.

A basic effect of most implementations of TIE data access systems is to ensure that a user, seeking data within a large data collection, is able to ensure that every query prepared will access at least one matching DataItem. This is achieved by guiding the user through the query formulation. At each stage of adding a term to the query, which typically narrows the number of DataItems that suitably match all of the terms of the query as modified by any Boolean properties, the user is presented with only such choices of DetailSelectors that are determined to match at least one DataItem if combined with the existing query formulation. Because the IM systems described herein was developed based on TIE systems, this basic effect is also a part of many implementations of IM systems.

In either TIE or IM systems, each DetailSelector is metadata that may be generated to represent and reference a particular Information Detail in the target data collection that it suitably matches. The set of all DataItems may encompass all of the Information Details in the target data collection. When these conditions are met, a query consisting of a single DetailSelector will suitably match at least one Information Detail, and consequently will reference at least one DataItem containing such detail. Thus, a user may initially choose any DetailSelector within the metadata. The user may then choose further terms to add to the query from DetailSelectors presented by the system. By virtue of the correlation between the metadata and the target data, the system is able to determine in advance the set of DetailSelectors that would suitably match at least one DataItem if added as a term to the existing query. The system may then present some or all of such choices to the user. Accordingly, by selecting from the choices made available by the system, the user is assured that the resulting query will suitably match at least one DataItem in the target data collection.

FIG. 1 is a graph-like illustration (substantially an annotated graph) of associations in a sample, very small database. Although this example is of necessity impractically small, it will be used to illustrate important aspects of an IM system using GlueSelectors, albeit showing only one level of GlueSelectors. The fact that the numbers of GlueSelectors and Items are all the same is purely incidental, for the convenience of the drawing, and is not meant to imply anything in general. Indeed, the number of Items is the largest of the three in a typical implementation.

FIG. 1 is a fictitious example, but demonstrates concepts that may be employed to facilitate data access through explicit associations of metadata. FIG. 1 shows metadata including explicit associations between metadata elements, and thereby describes (a small part of) a target data collection. The metadata reflects not only details of the information in the target data collection, but also a great deal of context. As examples, both GlueSelectors alone, and Groups of DetailSelectors and GlueSelectors provide context for details (or DetailSelectors) that are effectively members of such associative groups.

The content of FIG. 1 does not reflect a real database anywhere, but is modeled as an extremely simplified police department database. To avoid complicating the example, we assume that persons have only two facets or DetailSelector Groups describing them: their age and their weight. We similarly assume that vehicles have only two facets describing them: their make and their color. Therefore the FIGURE shows two DetailSelector Groups in each of two GlueSelector Groups.

The illustrated example reflects a database of incident Items that involve one or both of vehicles and people. Incidents of three types are reflected: Parking Tickets, Accidents, and Other. The target data collection itself is not shown at all. However, the target data collection is reflected by the ItemIDs, each of which references a particular DataItem, which is a particular predefined portion of the target data (not shown).

DATA ORGANIZATION: IM systems are typically non-hierarchical in nature. The file structure or other organization employed to store the target data is unimportant in principle, although there must be some mechanism by which any chosen elements of data can be accessed within the data collection. Metadata about the target data collection can be collected without changing or, for the most part, copying the target data. The existing referential techniques of the target data collection, such as file and directory or even URL references, may be employed. Thereby, the metadata need only comprise information as to where, within the target data, particular Items and Information Details may be located. However, accessing only in accordance with the existing file/data structure of the data collection may be relatively slow, and it may actually require more metadata to comprise more voluminous reference instructions needed for the existing system. Accordingly, some implementations of IM systems copy and reorganize data from a legacy database, disposing useful data elements into records and/or fields of a database for speedy access, and to permit simplifying the addressing required to access the data.

The set of information that is to be comprised by a particular DataItem may be defined by an IM system, a system operator, or by a user. In the example of FIG. 1, ItemIDs 1 and 2 reference information about parking tickets, ItemIDs 3-13 reference general incidents, and ItemIDs 14-15 reference vehicle accidents. The user may be permitted to define the exact content of a Parking Ticket Item, or the content of Other incident Items. ItemIDs reference all of the data chosen for its corresponding DataItem, wherever such data may be disposed (e.g., whether such data is in one file or record, or spread out in a plurality of such locations). ItemIDs may be effected using any reference technique, but in some embodiments an ItemID is simply a number. The ItemID number then references one or more lookup tables, referencing additional information that is sufficient to access or determine the data comprised by the DataItem corresponding to the ItemID. Lookup tables may be used with both forward and backward lookup; in a preferred alternative, lookup tables are duplicated in reverse order so that lookup may generally be forward.

ItemID 15 represents an accident involving two people and two vehicles. Information about each person may well be "physically" incorporated with the data of separate files, as may information about each of the two vehicles. An alternative of disposing the detailed data about each of the two vehicles and each of the two persons in four separate records within a single database-type file is presently preferred for speed of access. The Item comprises information locating all of the information belonging to the DataItem, effectively aggregating such information irrespective of the file structure or organization of the target data. Thus, ItemIDs and Items are examples of metadata that describe elements of target data, and also describe associations between those elements.

SELECTORS: The DetailSelectors referenced by the DetailSelectorIDs shown in FIG. 1 are each associated with (so as to effectively comprise) a corresponding DetailSelector Name. In some embodiments, DetailSelectorIDs are simply numbers which reflect all of the relevant information through lookup tables. The lookup tables may comprise location references for the "content" of a corresponding DetailSelector. This is analogous to the manner in which ItemIDs may effectively comprise the DataItems and associations for which in actuality they may provide only location reference. Whether DetailSelectors are unitary elements that actually comprise the information that they reference is immaterial in such non-hierarchical IM systems. Thus, the DetailSelector Name may be considered "part" of the DetailSelectorID through "incorporation by reference," but physical proximity is unnecessary. DetailSelectors are first level, or Level-1, Selectors. Conceptually, there need be nothing "between" the DetailSelectors and the DataDetails that they represent and reference. The DataDetails they represent are typically indicated, or at least described, by the corresponding DetailSelector Name. DetailSelectors will be described subsequently in more detail.

Between the row of DetailSelectorIDs and the row of ItemIDs in FIG. 1 is a row of GlueSelectorIDs. Each GlueSelectorID references a corresponding GlueSelector that comprises all of the information referenced by such GlueSelectorID, in a similar manner as DetailSelector information is referenced by a corresponding DetailSelectorID, and DataItem information is all referenced by the corresponding ItemID. Accordingly, particular GlueSelectors may be considered as effectively comprising certain information, regardless of where that information is physically or electronically stored.

Only Level-2 GlueSelectors are shown in FIG. 1. Many additional levels of GlueSelectors are common, but illustrating them would unduly complicate FIG. 1. For graphical representation, each ItemID should be at a level one greater than the highest-level Selector in the system. Because the highest level Selector in FIG. 1 is Level-2, ItemIDs in FIG. 1 need only be of Level-3.

Information defining the association links between Selectors and/or Items need only be made available to the system as needed, by whatever means a programmer may devise. However, it may be convenient if GlueSelectors of any particular Level have ready access to (i.e., effectively comprise) information defining or identifying each association link therefrom to a higher level Selector or an Item, as well as similarly effectively comprising information identifying each association link therefrom to a lower-level Selector. In FIG. 1, all of the Selectors of lower level than the GlueSelectors are DetailSelectors, but this need not be the case for higher level (Level-N, N>2) GlueSelectors.

A BareSelector, also represented in FIG. 1, is always a Level-1 or DetailSelector. It is distinguished from other DetailSelectors by having a direct association link to an ItemID. Other DetailSelectors are associated with ItemIDs only indirectly via GlueSelectors. In some embodiments, DetailSelectors and ItemIDs may be considered linked (indicating suitable matching) only if they are monotonically linked, i.e., a path between them following association links may be traversed from one to the other always moving "up" to higher level entities, or by always moving "down" to lower level selectors. DetailSelectorID 16 represents a BareSelector named "Accidents," plus association links to ItemIDs 14 and 15. DetailSelectorID 17 represents a BareSelector named "Parking Tickets" and an association link to ItemIDs 1 and 2. Because they are directly linked to ItemIDs, BareSelectors typically define an entire type or class of DataItems that are conceptually related.

GROUPS: FIG. 1 also illustrates examples of Selector Groups, including four DetailSelector Groups referenced by Selector GroupIDs 1-4. Each Selector GroupID may reference all of the Selectors that are members of the Group, as well as a descriptive name that reflects a common concept that unites the members. The name of DetailSelector Group 106, for example, is "Vehicle Color," and the group includes Blue (the DetailSelector referenced by DetailSelectorID 1), Green (DetailSelectorID 3), Purple (DetailSelectorID 4), and Dark (DetailSelectorID 2). Each DetailSelector Group may typically represent a "facet" or particular aspect of an Item or Subitem; thus, in FIG. 1, two representative facets (Vehicle Color and Vehicle Make) are shown for Vehicles, and two representative facets for Persons, namely Age 310 and Weight 112.

The members of the DetailSelector Group 1, Blue, Dark, Green and Purple, may be members of other DetailSelector Groups, such as House Color, Boat Color or Coat Color. When the Group represents a particular facet of a particular item (e.g., the color facet of a vehicle), group membership may be used to distinguish same-named DetailSelectors by providing one indication of context for the DetailSelector. Such distinction according to context is an important aspect of some embodiments of IM systems, and will be described in more detail later.

The DetailSelector "Dark" is an example using synonyms whereby a DetailSelector may be considered to suitably match a group of different Information Details that fall within a range deemed synonymous to the corresponding DetailSelector Name. For example, a DataItem including a Vehicle Color of dark red, black, dark gray, dark purple or medium to dark brown may all be considered to match DetailSelectorID 2 as synonyms. Color DetailSelectors may typically match a range of synonyms. For example, a DetailSelector "Blue" may suitably match "medium blue," "powder blue," or "midnight blue." The DetailSelectorID may also reference any number or range of such matching synonyms. A dictionary definition may not match "synonym" as used herein, where it means a "stand in" for a group of words, values, or even part of a word.

DetailSelector Group 2, 108, comprises a name "Vehicle Make," as well as reference to the member vehicle makes Allegro (DetailSelectorID 5), Buick (DetailSelectorID 6), Chevy (DetailSelectorID 7), and Dodge (DetailSelectorID 8). Of course, most practical Vehicle Make Groups would include far more DetailSelectors. These may be "exact" DetailSelectors, which are considered to suitably match a DataDetail in a DataItem only when the names are identical. Even here, though, DetailSelectorIDs 6-8 may all be considered to suitably match a DataDetail of "Vehicle Make "GMC." Control of the range of synonyms considered a match may be defined by the system administrator, installer, or may be made user definable. Information about such range of synonym matches may be comprised within the DetailSelector by reference from the DetailSelectorID.

Members of the Vehicle Color Group 106 and members of the Vehicle Make Group 108 are examples of Details that apply to a particular Vehicle. A query will have less ambiguity if "Green" and "Chevy" are not only required to suitably match Information Details in a particular DataItem, but are explicitly required to suitably match a Subitem within such DataItem, such as one vehicle out of a plurality of vehicles that may be comprised in such DataItem. To reflect that a plurality of DetailSelectors thus need to be attributes or descriptions of a particular Subitem, such plurality of DetailSelectors are "glued together" by a GlueSelector that has an association link to a plurality of DetailSelectors.

GlueSelectors 1-8 (i.e., having GlueSelectorIDs 1-8) are all members of a Glue Group 102, as indicated by the corresponding dotted line. Glue Group 102 has a corresponding name, "Vehicle." The Details associatively linked to GlueSelector members of the Vehicle Glue Group all should apply to a particular vehicle to avoid ambiguity. Otherwise, a query seeking a DataItem having a Blue vehicle, a Chevy, a Green vehicle and an Allegro might reference a DataItem having four distinct vehicles, each of which has one of the query details, but none of which actually matches the intended target. Because the associatively linked details make sense only as descriptions of a particular vehicle, they are not associatively linked to DataItems except via a Vehicle Group GlueSelector.

Of course, the example in FIG. 1 is greatly simplified. In a practical example, more details would typically be aggregated by a Vehicle GlueSelector. However, it will often happen that not all of the details are known about a particular vehicle. GlueSelectorID 4 is an example in which the vehicle is known to be Green, but the make of the vehicle is not known. GlueSelectorID 4 is not actually a GlueSelector as defined, because it has an association link to only a solitary lower level Selector (DetailSelectorID 3). In a real system there would be additional Selector Groups encompassed within the Vehicle GlueGroup 102, and the absence of data for one DetailSelector Group, such as "Make," would still include data for a plurality of DetailSelector Groups, perhaps including "Body Type" or "License Plate" or "Vehicle ID." GlueSelectorID 4 simply illustrates that not all GlueSelectors need have information from all Selector Groups within the corresponding GlueSelector Group.

The dotted-line box 104 indicates a GlueGroup named "Person" that comprises an Age DetailSelector Group 110 (Selector GroupID 3), and a Weight DetailSelector Group 112 (Selector GroupID 4). GlueGroup "Person" further includes the GlueSelectors referenced by GlueSelectorIDs 9-15. Each of the GlueSelectors represents a Detail from each of the encompassed DetailSelector Groups "Age" and "Weight," and both represented Details describe the same Person. The GlueSelector has an association link (a line) to an Item comprising a person description suitably matching the represented Details. For example, GlueSelectorID 9 references association links to DetailSelectorIDs 11 and 13, and an association link also to ItemID 9. As may be seen, the metadata, including the indicated associations, indicates that ItemID 9 references a DataItem that includes a person described as 21-40 years old and weighing 160 pounds.

(Below, for simplicity, "DetailSelector" refers also to its name, ID and all closely referenced data; similarly, "Items" refers to any corresponding Items/ID/Information Details.) DetailSelectors 1-9 are each deemed suitably matched by an Information Detail in any Item that has any value within the named range and type. Thus, Items 3 and 7, because each has an association link to GlueSelector 11, both describe a person that is 18-20 years of age and weighs some range around 161 pounds. Of course, the indicated ranges would not often be employed: the ranges of DetailSelectors 9, 11 and 12 are too broad to be very helpful, while the implied range around the stated values of DetailSelectors 13-15 are rather too narrow. These DetailSelectors indicate, however, that wide or narrow ranges, and regular or irregular ranges, may be established as desired in a particular situation, or even made user adjustable.

IMPLEMENTATION: In a preferred implementation, each GlueSelector, each DetailSelector, and each Item is represented by a number, called the ID number, which is a reference to the actual entity name and the comprised information. To determine the actual entity name from the ID number, or to determine the ID number from a given entity name, lookup tables are used. These tables may be one-to-one, in a preferred embodiment, because the ID numbers for each entity are unique across all groups. (However, other implementations may, for example, re-use the ID numbers in different groups, adding the GroupID to the entity ID to make the combination unique.) The ID numbers may be unique within the entity type, as exemplified in FIG. 1. That is, the ID number alone does not tell us whether it refers to a DetailSelector or to a GlueSelector—that information must be known before the ID number can be looked up, because different tables hold the values.

In an alternative implementation, all Selectors are assigned consecutive numbers. For example, the numbering may start with the DetailSelectors, followed by the BareSelectors, then proceeding through all the GlueSelectors with a continuous sequence of numbers. Thus numbered, each Selector has a unique number, and finding which type and group it belongs to is a matter of looking up a table of number ranges.

Innumerable alternatives for referencing the data are possible, all having substantially the same effect, though varying as to data efficiency and processing speed. In the example represented by FIG. 1, references from ID to the information (such as name) of the referenced entity are described in conformance with an alternative by which separate tables are used for lookup depending upon direction, thereby usually avoiding a need to lookup backwards. Other lookup tables hold the many-to-many associations between an ID and any referenced entity, such as another Selector, that are represented by the lines of the graph-like diagram of FIG. 1.

All tables can be looked up in two directions. For example, given the ID number of a DetailSelector, the corresponding name can be looked up in a "forward" direction of lookup (from ID to name). Conversely, given the DetailSelector name, a search finding such name can then identify its associated ID number by "reverse" lookup in the same table. There are many ways lookup tables can be implemented, including a preferred table implementations as sets of arrays. The index of each array element can then be made either the ID number of the respective name, or related to that ID number in a very simple way (such as a simple constant subtracted from or added to the to number). The precise details are determined by how IDs are assigned to corresponding individual elements.

When ID numbers are used as indices of arrays, the lookup speed of a given ID is as fast as it can be using a high level programming language, because such usage effectively and very simply converts the ID number to an address in memory at which the required data is located. Accordingly, the forward lookup in such tables is very fast. However, a reverse lookup may then require looping through all array elements in an inelegant search to find the matching name. Of course, if the array element values are organized in some ordered fashion, such as alphabetically, then a binary search can be used that will reduce the time considerably.

In one implementation, ID numbers of DetailSelectors are stored and assigned in alphabetical order within each Group. The DetailSelector Group name is also replaced by a number through a lookup table, but the number of Groups is relatively small, so lookup times are not significant in this case. Adding the Group number to the DetailSelector name to serve as the most significant part of the combination of referencing numbers allows all the DetailSelectors to be sorted Into a single sorted list, and allows sequential numbers to be assigned for each successive ID number. Such an arrangement allows us to use a binary search for reverse lookup and to maintain default alphabetical sorting order.

Reverse lookup of IDs is required infrequently compared to forward lookup, because a user typically chooses a relatively small number of DetailSelectors, which at most require a single reverse conversion to identify a corresponding ID number. By contrast, a single chosen DetailSelector may be associated with a very large number of GlueSelectors, and, through them, a very large number of Items, each of which is referenced by ID numbers and thus requires only forward lookup.

Query evaluations are preferably performed primarily using ID numbers, with as little reference to other information as necessary, as demonstrated in the following example. The example is completed with an illustration of just one ItemID number translation and one DetailSelectorID number translation.

For various reasons of convenience, the table lookup process may preferably include two lookup steps. The ItemID (sequential numbers assigned each Item at initialization and during pre-processing) are looked up in a table and converted to another number which we shall call the Item Offset, explained below.

An Item may be implemented as a list of its components, such as a reference number of associated records, documents, or, other list of connected data elements. To minimize the memory required to reference an Item, most of the list is looked up only when the user needs to see the data. This is relatively infrequently, and moreover a user generally can view only a relatively small number of Items. Furthermore, often the user may be satisfied with viewing a very short description of an Item, rather than all of the information it comprises. Therefore it may be convenient to store such a short description (e.g., the Item Name) in a special Item File, together with the list of references to the item components. In such arrangement, the byte offset of the start of each component listing comprised by an Item may be employed as an Item Offset, and may be obtained from a lookup table using the ItemID.

The following table shows examples of different DetailSelector Group kinds:

TABLE 0

| Selector Kind | Description |
| --- | --- |
| Exact | Words or phrases that find exact matches within the data field |
| Range | Finds the field which is a match to any value within the range specified by the synonym, which, for convenience, is just the highest value of the range. |

TABLE 0-continued

| Selector Kind | Description |
| --- | --- |
| contains | A synonym matches the field if the field contains the synonym. All synonyms are checked for their presence in the field. A field can therefore cause a multiplicity of selector assignments. |
| contained (all) | The field value is contained in the synonym. When the "all" option is included, every synonym is searched for a match, otherwise the first match ends the search. |
| alpha | Individual letters and digits form the vocabulary of Selectors and synonyms in this group. For each letter or digit in the field the respective Item is assigned the corresponding letter or digit Selector. |
| alpha position N | This is a Group Set of Alpha Selectors, where each Group (of which there are N)refers to the respective character position within the field's text and the whole set of Groups refers to a field and thereby Item Facet. |
| alpha range | This is a range but not numeric that is alphabetic. The synonym of each Selector is the end of each range. |
| omit first | Omits first word from the field before comparing it to find a match with a synonym. |
| first word | Checks the first word of the field for a match with a synonym. |
| second word | Check the second word for a match with a synonym. |
| first N digits | Takes the first N digits of the field and checks for a match with the synonym. |
| second N M digits | Takes the M digits following the first N digits and checks for a synonym match. (The middle digits.) |
| last N digits | Takes the last N digits of the field and checks for a match with a synonym. |
| number of digits | The numbers from 1 to some number, usually no more than 9, are the Selectors and synonyms of this Group, each representing the number of digits in the field. Counts the number of digits in the field and matches with a synonym. |
| formula <expression> | The <expression> is any legal Perl expression in up to two fields, using $1 and $2 for the first and second field, where the two fields are specified in the "is_to_fields" with the dash between them. For example: file_name1,3-5, The result of calculating the formula from the values of the two fields is used to find a match to the synonym of the Group's vocabulary. |
| diff(erence) | Difference kind, so that the difference between two field values, specified in the "is_to_fields" tag, in the form file_name,4-5, where the numbers represent, as usual, the field ordinal count IDs. This is often used together with the date and time kinds. Parenthesized characters are optional. For example, when the difference of two field values is needed, such as the response time from receiving a phone call to dispatching a unit to a scene. |
| date (time) (Julian) (epoch) | The field is treated as a date in any number of formats, most of which are automatically guessed. The Julian date, however, is not guessed but requires the Julian Kind. Parenthesized words are optional. The date is automatically split into year, month, day, and day-of-week. Time is extracted if the "time" option is included. Each component is checked against the corresponding Group synonyms. When the "epoch" option is used, the base date is midnight the night before Jan. 1, 1980. The date is then the number of second from that base date. It is converted to a sane, normal date, before being used in the normal matching of synonyms. |
| leave year alone | Without this option, two digit years are guessed and converted to 4 digit years. This option leaves them as two digit years. |

One very useful Group Kind is the Alpha Position Kind. The Alpha Position Selector Group allows you to progressively choose, or enter a character for each position in the text of a field. (Positions can be chosen, or entered in any order.) This is ideal for those situations where you only know some of the characters in the text. A very good example of the application of this is in police crime databases in which a partial license plate search is needed. In those cases the license plate field data is used as the facet in a Selectors Vocabulary, configured as an Alpha Position Detail Group. Another example is a name search where the spelling of the name is not known. Using an alpha position Group, or the less strict Alpha Group (independent of position), the user can enter only the known characters in the name, see the listing of matching names, and choose from amongst them.

The following definitions apply in general to all implementations of an IM system that includes such feature. To make their meaning clearer, the definitions include specific examples, which must not be taken to limit their meaning.

An Item is any part of data, taken from a data set, referred to here as a "Data Base." When the Data Base is a traditional, structured database, an Item may be part of a record, a whole record, or a plurality of associated records. Associated records, loosely defined, are records that contain associated pieces of information. Such associated records are often "linked" together, to form an Item, using field values (or even a part of a field value and sometime combinations of parts of field values) of fields which we refer to as the linking fields. Note that "association link" is used herein exclusively to refer to an explicit and direct association between two entities (DetailSelectors, GlueSelectors or Items). It is direct in that it does not traverse any other entity.

For example, in a structured database about people, events and places, a Location Item can be a collection of records (about people, events and places) in which the address field is the same. This would be achieved by linking records on the value of the address field. An example of a more general, or Street Item could be a linkage on just the street name in the address, i.e., on just a part of the field. Another example of an Item is a linkage of all records with the same value of some ID field, such as an Incident ID, identifying an incident.

As another example, the database may be a collection of web pages. Each web page may be an Item; or all web pages mentioning some topic may be linked together as an Item. An Item is simply a set of referenced data, and may be anywhere or in many different places. A web page is referenced by a URL that may suffice to reference the Item. An Item comprising a collection of web pages may be referenced by, e.g., a list of the URLs to each component page. It may alternatively and more simply be referenced using a well known double-referencing technique, which uses a single reference to a location within a link file in which the list of references to the component web pages is stored.

A link file may be implemented by representing each Item as one line (i.e., a string of characters ending in a new-line character) consisting of a data fragment reference followed by a suitable separation character (e.g., Tab) followed by the next data fragment reference, and so on until the end of the Item is designated with a new-line character. The separation character is usually chosen to be one that cannot appear in the data fragment reference. If the references are URLs, the character separator may be a Tab, which is not generally used in URLs.

The information in an Item may be embodied in any available medium, or a combination of media, such as for example: text, sounds, pictures, and movies. It may be as small as a single character of text, or a single sound or picture or any combination of all these, or many such combinations. What precisely is comprised by an Item should be a choice made by the implementer for the convenience of the user in the specific application. Often several different options are possible, and for some purposes (e.g., to avoid data ambiguity) the same Item of information is viewed as a plurality of Items, or virtual Items, each associated with a different set of Selectors.

A Selector is any symbol or set of symbols used to select Items. Such symbols may be graphics, language based characters, or sounds, and may be static or animated. There are many different ways of interfacing the Selector to the user. A Selector is independent of the way it is interfaced. The most common Selectors are represented by individual characters, words, or phrases, and use the interface of a mouse or keyboard for user access. However, a Selector may also be any sound, where a receiver of the sound identifies the particular sound representing a Selector using any known sound identification technique, and then sends it for action to a program.

For example, a Selector may be any sequence of letters, including a single letter, or any symbol, sound, graphic of any kind which is used to select data. Selectors can be associated with Items, in which case each such Selector selects an Item or a plurality of Items (the Selected Items) from amongst a Data Base of Items (the Target Items). Alternatively, Selectors can be associated with each other to form the first level of GlueSelectors. These in turn can be associated to form second level GlueSelectors, and so on, GlueSelectors at any level may be, and those at the last level must be, associated with Items.

The Selected Items may be part of the Target Items, or in some rare cases, may even include all Target Items. If voice control of computer programs is used, a Selector may be a sound, while in an application using pattern recognition, a Selector may be a picture or some identifiable picture attribute or facet. In some hardware implementations, a Selector may be accessed by a physical button control, a keypad control, or any other physical control which can be chosen from a plurality of such controls. A Selector may also be accessed by a combination of the above. For example, in a voice control system, a selector may be accessed by a spoken command identifying printed text or graphic on a display device. When the spoken command is recognized, the displayed text version of the spoken Selector may be highlighted or otherwise identified. When a picture is used as a selector identifier, the picture may include text.

DetailSelectors are Selectors associated directly with GlueSelectors and are used to choose said GlueSelectors. DetailSelectors are Selectors used to express the detail facet associated with an Item. Each DetailSelector is associated with one or more GlueSelectors. The size and detail of a DetailSelector, or any other selector, is a choice for the installer of the IM system.

In one application, DetailSelectors are persons' names chosen from a list of names, without distinction between the first name and last name. Each Selector from such a list represents a name, which can be either a first name or a last name in any Item. As another example, a DetailSelector may be the first letter of a name, and another DetailSelector, the second letter of the same name, and so on, for all the letters of the name, defining an Alpha Position Group Set, as described in patent '566. As another example, a DetailSelector may be any letter in the name, independent of position, defining an Alpha Group also described in patent 566.

When DetailSelectors are considered out of context, their meaning has at least some ambiguity. For example, a crime database comprises data on several kinds of people: the suspect or perpetrator, the victim, the witness, and the police officer. Accordingly, a DetailSelector of an age group such as 21-35 years, absent information on the person referenced, will be ambiguous as to that context. But even if it is specified to refer to, the victim (which may be achieved by making the Selector a member of the Victim Selector Group), and an Item contains more than one victim, it is still ambiguous as to which particular victim it refers to. Associated GlueSelectors can be configured to resolve those ambiguities of the DetailSelectors, but it may not always be necessary, or desirable, to resolve all ambiguities.

GlueSelectors are Selectors associated directly with Items. GlueSelectors express more information about a facet of data than the DetailSelectors. Each is commonly, though not always, a collection of values of fields from records. It is convenient to organize GlueSelectors, similarly to DetailSelectors, into Glue Groups, where each Glue Group describes some person, place, thing, event, or some other facet of an Item. Each GlueSelector is directly associated with one or more Items. For example, in a crime database, three Glue Groups could be described as: Vehicle Description, Person Description, and Location.

The DetailSelectors (ItemSelectors as described in the 566 patent) are also, for convenience, organized into Groups, where each group describes some detailed facet of the data. Sets of these Groups are each associated with a Glue Group. Such Sets are referred to as Glue Sets or G Sets. For example, in the crime database exemplified above, the DetailSelector Groups associated with the Vehicle Description Glue Group could be described as: Make, Model, Body Style, License Plate, etc. Each of these Detail Groups is said to belong to the Vehicle Description G Set.

The definition of a GlueSelector or a DetailSelector depends on context. A GlueSelector effectively comprises all the information in every associated DetailSelector, at least when the DetailSelector is associated by monotonic linking to the GlueSelector. However, such GlueSelector retains a context for the DetailSelector information, minimizing data ambiguities. A GlueSelector in one implementation may be a DetailSelector in another. In addition, a client interface may have the capacity to effectively introduce a lower layer of Selectors, which would be Selectors of DetailSelectors. Thus, a DetailSelector is the lowest level Selector in a particular context, but if the context changes it may effectively become a GlueSelector. The converse is also true.

Implementing an IM system includes deciding which facets of data are to be described by GlueSelectors and which by DetailSelectors. Once the decisions have been made, we define a GlueSelector as that Selector which is not directly associated with any actual target data (i.e., DataItem or Information Detail), but only via at least one other entity (a DetailSelector or an Item). A DetailSelector, however, is directly associated with a corresponding Information Detail, while an Item is directly associated with a DataItem.

It is useful to define the special case of Selector called a BareSelector, which is a Selector that is directly associated (i.e., has an association link) to an Item. It may be directly associated with actual data, like a DetailSelector, or it may be a conceptual entity more like a GlueSelector. It does not have association links with any DetailSelectors, so it is used like a detail Selector. Selectors that do not need context (e.g., are their own context) are generally configured as BareSelectors. For example, Item Type Selectors are used in implementations which have their data organized into several different kinds of Items, as for example Incidents, Locations, Vehicles, and People. Item Type Selectors are generally configured as BareSelectors, because their meaning is clear without the need of context. However, although these are high-level, multifaceted entities, they are represented by data in a corresponding DataItem, so perhaps they are most like DetailSelectors.

Consider an example of "any name" as a DetailSelector Group, such that each name in the Group is a first, a last, or a middle name. An associated GlueSelector may then consists of a first name, a middle name (if used) and a last name, without any ambiguity as to which is first and which is last. Such a GlueSelector "glues" together the individual name components, resolving one or more ambiguities inherent in the DetailSelectors. More precisely, the GlueSelector which is the complete name (first and last) glues the DetailSelectors comprising it, so that for example, a user may choose a name from the DetailSelectors Group, without concern as to which kind of name it is, and then view the list of matching Glue-Selectors, which show which kind of name it represents in each Item which contains that name. Some of the matching GlueSelectors might contain the chosen name as the first name while others could contain it as the middle, or last name.

TABLE 1

DetailSelector Names

| Detail Group Name | Group ID | DetailSelector Name | ID |
|---|---|---|---|
| color | 1 | blue | 1 |
| color | 1 | dark | 2 |
| color | 1 | green | 3 |
| color | 1 | purple | 4 |
| make | 2 | Allegro | 5 |
| make | 2 | Buick | 6 |
| make | 2 | Chevrolet | 7 |
| make | 2 | Dodge | 8 |
| age | 3 | 0-17 | 9 |
| age | 3 | 18-20 | 10 |
| age | 3 | 21-40 | 11 |
| age | 3 | 41-100 | 12 |
| weight | 4 | 160 | 13 |
| weight | 4 | 161 | 14 |

TABLE 1-continued

DetailSelector Names

| Detail Group Name | Group ID | DetailSelector Name | ID |
|---|---|---|---|
| weight | 4 | 162 | 15 |
| Item Type | 5 | accident | 16 |
| Item Type | 5 | parking ticket | 17 |

TABLE 2

Item Offset

| Item Offset | ID |
|---|---|
| 0 | 1 |
| 234 | 2 |
| 577 | 3 |
| 890 | 4 |
| 1478 | 5 |
| 1874 | 6 |
| 2201 | 7 |
| 2673 | 8 |
| 3321 | 9 |
| 3576 | 10 |
| 3993 | 11 |
| 4589 | 12 |
| 4765 | 13 |
| 5123 | 14 |
| 5781 | 15 |

Table 1 connects the DetailSelectorIDs with their names and their Group and Group ID. It also includes two BareSelectors which specify the Item Types with a Group ID of 5. This table may be stored as a plurality of tables, which may be more efficient by avoiding a necessity of repeating the group ID and Group name values. The Group ID may be used to order the Groups in relation to the ID numbers and is used internally by the program. The Group Order may be anything, at the implementer's choice.

Keeping a particular reproducible ordering allows efficient storage and lookup of the Group membership of every DetailSelectorID. For example, all that needs to be stored and checked is the starting value of the ID number for each Group name and ID.

The age ranges in table 1 are another example of possible synonym usage, where the precise ages within each range are synonyms of that range. However, it is often convenient to implement such translation of exact-to-range at the user interface, where the DetailSelectors are translated to ranges.

FIG. 1 shows only the ID number representations of all entities. Table 1 is a lookup table for association links to DetailSelectors (which correspond to DetailSelectorIDs shown in FIG. 1), while Table 2 is the comparable lookup table for Items (corresponding to ItemIDs). In many implementations, GlueSelectors have little information useful to a user beyond the names of linked DetailSelectors and the name of the GlueSelector Group (Vehicle) of which it is a member. Both of those items are available elsewhere by reference. As such, GlueSelectors typically need only association Table 3, and do not need a lookup table for names.

To find the data associated with each ItemID in this implementation comporting with FIG. 1, first enter Table 2, the Item offset table, to determine the offset into the Item File. The Item File, in turn, stores a further table, for example a plurality of file-name-offsets, each pair representing the location in a file of a part of the DataItem (in structured databases, these parts are usually records and the file names are the table names of the records).

Only the Item Offset table is shown here as table 2. The offsets are the actual byte counts, from the start of the file, at which the respective file-name-offset begins. The end of the Item in that file can be designated by any convenient character such as a new line character. So for example, the item with ID number 3 can be found listed as file-name-offset references in the Item File at byte number 577. The byte offsets in the example table 2 may be sequential for convenience in assignment, but this is largely arbitrary, as in practice nothing depends on the offsets being sequential.

It is preferred that associations between the first two levels of Selectors do not cross a Glue Group boundary. This is consistent with FIG. 1, in which the descriptions of vehicles and those of people do not overlap. Unless otherwise stated, this condition is assumed.

TABLE 3

DetailSelector Associations

| DetailSelectorID | Associated GlueSelectorIDs | | |
|---|---|---|---|
| 1 | 3 | 7 | |
| 2 | 1 | 6 | |
| 3 | 2 | 4 | |
| 4 | 5 | 8 | |
| 5 | 1 | 5 | |
| 6 | 2 | 6 | |
| 7 | 3 | 7 | |
| 8 | 8 | | |
| 9 | 10 | 12 | |
| 10 | 11 | 13 | |
| 11 | 9 | 14 | |
| 12 | 15 | | |
| 13 | 9 | 10 | |
| 14 | 11 | 12 | |
| 15 | 13 | 14 | 15 |

TABLE 4

GlueSelector Associations

| GlueSelectorID | Associated DetailSelectorIDs | | |
|---|---|---|---|
| 1 | 2 | 5 | |
| 2 | 3 | 6 | |
| 3 | 1 | 7 | |
| 4 | 3 | | |
| 5 | 4 | 5 | |
| 6 | 2 | 6 | |
| 7 | 1 | 7 | |
| 8 | 4 | 8 | |
| 9 | 11 | 13 | |
| 10 | 9 | 13 | |
| 11 | 10 | 14 | |
| 12 | 9 | 14 | |
| 13 | 10 | 15 | |
| 14 | 11 | 15 | |
| 15 | 12 | 15 | |

Table 3 is an association table that stores associations of DetailSelectors with GlueSelectors. This table implicitly defines each GlueSelector as an association of DetailSelectors, though not in an easy lookup manner. Because users enter DetailSelectors which are linked to GlueSelectors, it is designed for easy lookup of the GlueSelectors associated with a given DetailSelector. For example, the DetailSelector with ID 4 (vehicle color purple) is linked with GlueSelectors 5 and 8, while the DetailSelector with ID 15 is linked with GlueSelectors 13, 14, and 15.

Table 4 contains the same information as table 3, except listed for reverse lookup (as compared to table 3). Thus, one lookup with a GlueSelectorID number yields the list of associated DetailSelectors. For example, the GlueSelectorID number 8 is associated with DetailSelectors ID numbers 4 (vehicle color purple) and 8 (vehicle make Dodge).

TABLE 5

GlueSelector to Item Associations

| GlueSelectorID | Associated ItemIDs | | |
|---|---|---|---|
| 1 | 8 | 15 | |
| 2 | 1 | | |
| 3 | 14 | | |
| 4 | 2 | 10 | |
| 5 | 3 | 9 | |
| 6 | 4 | | |
| 7 | 5 | 15 | |
| 8 | 6 | | |
| 9 | 1 | 9 | |
| 10 | 2 | 10 | |
| 11 | 3 | 7 | |
| 12 | 6 | 11 | |
| 13 | 5 | 12 | 13 |
| 14 | 4 | 14 | 15 |
| 15 | 8 | 15 | |

TABLE 6

Item to GlueSelector Associations

| ItemID | Associated GlueSelectorIDs | | |
|---|---|---|---|
| 1 | 2 | 9 | |
| 2 | 4 | 10 | |
| 3 | 5 | 11 | |
| 4 | 6 | 14 | |
| 5 | 7 | 13 | |
| 6 | 8 | 12 | |
| 7 | 11 | | |
| 8 | 1 | 15 | |
| 9 | 5 | 9 | |
| 10 | 4 | 10 | |
| 11 | 12 | | |
| 12 | 13 | | |
| 13 | 13 | | |
| 14 | 3 | 14 | |
| 15 | 1 | 7 | 14 | 15 |

Table 5 stores the association links of GlueSelectors to Items to find the Items linked to chosen GlueSelectors.

Table 6 stores the same information as table 5 but for reverse lookup (relative to table 5). It is used to find a set of available GlueSelectors (those associated with the chosen Items) in all Glue Groups which the user has effectively not chosen, by not choosing any corresponding DetailSelectors. Each found ItemID number is looked up in this table, and the list of associated GlueSelectors is collected by adding each Item's contribution (omitting duplication). For example, if the found ItemID numbers were 3, 5, and 9, the associated set of GlueSelectorID numbers would be [5, 11]+[7, 13]+[5, 9]=5, 7, 9, 11, 13.

A dynamic table of all Selectors, such as an array with the index as the SelectorID number, with a Boolean (zero or 1) in each element initialized to false (0), may be used to quite simply evaluate such available Glue and DetailSelector sets. For each available ID, the array element with the ID number as index is set to 1. The available Selectors in each Group can then be read from the array, knowing the range of ID numbers (array indexes) in each Group.

TABLE 7

BareSelector to Item Lookup

| BareSelector Name | BareSelectorID | Associated ItemID |
|---|---|---|
| Accident | 16 | 14 15 |
| Parking Tickets | 17 | 1 2 |

TABLE 8

Item to BareSelector Lookup

| ItemID | Associated BareSelectorIDs |
|---|---|
| 1 | 17 |
| 2 | 17 |
| 14 | 16 |
| 15 | 16 |

FIG. 1, Example 1, First step: Searching for a blue vehicle. A user chooses Blue from the Vehicle Color DetailSelector Group in a client-server implementation. The client displaying the DetailSelector name Blue references it as ID 1, sending the server the simple Boolean query: 1. The server looks for all GlueSelectors associated with DetailSelectorID 1 by entering an equivalent of table 3 (also equivalent to moving "up" from DetailSelectorID 1), and finds GlueSelectors ID 3 and 7 are associated (linked) with it. Entering an equivalent of Table 5 with GlueSelectorIDs 3 and 7 (i.e., going up again in FIG. 1) finds ItemIDs 5, 14 and 15, which is the union set of Items associated with GlueSelectors in the same Glue Group that are associated with DetailSelector Blue. After translation of the ItemID numbers to offsets using an equivalent of Table 2, the server returns the ItemID information to the client as the response to the "short query." Notice that the determined ItemIDs are monotonically linked to the Blue DetailSelector, i.e., connected by a path of association links that can reach from one to the other going always the same direction (always up or always down). In this case, the link path is monotonically up from Level 1 (DetailSelector) to Level 2 (GlueSelector) to Level K (Item). Certain kinds of association between entities that translate to Graph Vertices require such monotonic linking.

Next the server evaluates the "available" GlueSelectors, which are those that are associatively linked to one of the identified Items. In this case it includes GlueSelectors 1, 3, 7 and 13-15, as may be seen by following the association links back down from the identified Items 5, 14 and 15, or, as by the system, by lookup in Table 6. From that information it finally evaluates the available DetailSelectors via a Table 4, or by again going "down" from GlueSelectors 1, 3, 7 and 13-15.

A special rule applies to the GlueSelectors from the original Glue Group (Vehicle). These include 1, 3 and 7; but the valid selections are the intersection of the first-identified GlueSelectors (3, 7) with such those that are located by following the tables (1, 3, 7), which in this case is simply (3, 7). All of 13-15 are valid, because they are in other Glue Groups. From the determined GlueSelectors, IDs 3, 7 and 13-15, Table 4 yields DetailSelectors 1, 7, 10-12 and 15. Using Table 1 (or viewing FIG. 1), these correspond to Vehicle Color Blue and Make Chevy, Person Age 18-20, 21-40 and 41-100 years, and person weighing 162 pounds. The BareSelectors associated with the found Items are also evaluated, using Table 8, which yields just one, BareSelectorID 16, Accidents. This part of the evaluation is called the "long query" because it generally takes much longer to evaluate.

The server also sends the client a count of the matching Items and for each available DetailSelector, as well as a count of associated GlueSelectors, for optional display to the user. The counts of GlueSelectors associated with each DetailSelector are obtained from table 3, as summarized below in Table 9:

TABLE 9

GlueSelector counts for each available DetailSelector

| DetailSelectorID | Count of Associated GlueSelectors |
|---|---|
| 1 | 2 |
| 7 | 2 |
| 10 | 2 |
| 11 | 2 |
| 12 | 1 |
| 15 | 3 |

The client receives the short and long query responses, and adjusts the displayed DetailSelectors to show no more than those that are "available," namely only the available ones, those to which the numbers 1, 7, 10, 11, 12, 15 translate using table 1, namely Vehicle Color Blue and Make Chevy, Person Age 18-20, 21-40 and 41-100 years, and person weighing 162 pounds.

Summary: Suitably Matching Items: 5, 14, 15; Available Glueselectors: 3, 7 and 13-15, Available DetailSelectors in any conjunctive Group: 1, 7, 10-12 and 15; BareSelectors: 16.

DetailSelector Groups have Boolean properties associated with them. For example, color groups are often chosen to be disjunctive by default Available DetailSelectors in a disjunctive group generally should not be limited by any choice of selectors made from such group. Our evaluation previously assumed all DetailSelector Groups were conjunctive. A disjunctive Boolean character of a group means that other DetailSelectors in the group are always available alternatives to be chosen by the user. If selected, they provide further links and thereby expand the possible number of matching Items. Deeming the color group to be disjunctive in this example, the available DetailSelectors, after adding back all of the conjunctive DetailSelectors, become IDs 1, 2-4, 7, 11, 12 and 15. In the other groups, deemed conjunctive, DetailSelectors are not added back to the DetailSelectors evaluated as available.

In the first step a user chose a blue vehicle, and the system returned an indication of the remaining available DetailSelectors. If DetailSelectors are "available," then the user may add them to his existing query and the resulting query is guaranteed to suitably match at least one Item, as follows logically from the associations as described and illustrated in FIG. 1.

FIG. 1, Example 1, Second step: Choose person's age 21-40. The system returned available DetailSelectors describing a vehicle and describing associated people. "Buick" is not among the available Selectors; consequently, if a blue Buick was sought then the user can give up, because its absence from this database has been demonstrated. The only Make that is available as a Blue vehicle is a Chevrolet. If we were looking for a Chevrolet, we could pick it next. In our example, we would not even need to pick it, because all three Items have Chevy (ID 7) associated with them. However, in a real database, it is possible that some of these Items would have an empty vehicle Make field. By a rule that may be used to avoid uncontrolled matches, Items with an empty Make field are eliminated when a particular Make is chosen, so choosing any make would have an effect. A rule that works well in many practical cases is to always imply the conjunctive ("and") between DetailSelectors in different Detail Groups, regardless of the Boolean property of each Group. The disjunctive "or," as an alternative in a query, is most practical between facets of the same kind.

The available age range 21-40 (ID 11) is chosen next. If the implementation of the client-server is "stateless," then the client must send the complete query which (numerically) is: "1 and 11." Choosing both 1 and 11. DetailSelectorIDs means the server must evaluate the query in parts, one for each subset of chosen DetailSelectors for each Detail Group. DetailSelectorID number 1 is from the Color Group whereas ID number 11 is from the Age Group. Therefore two queries are evaluated by the server and the conjunctive taken between them. Thus, first the available GlueSelectors in each Group are found, and then the intersection of these sets is evaluated to obtain the available GlueSelectors.

In this special case where there are only two Glue Groups and where there is a chosen DetailSelector from each of the Glue Groups, the intersection of the available GlueSelectors determined from each Glue Group's chosen DetailSelectors, is in fact the same as the union of the chosen GlueSelectors in each Glue Group associated with the chosen respective DetailSelector. This however rarely happens in real situations, because it is rare for a user to choose at least one DetailSelector from each Glue Group.

The server evaluates the GlueSelectors associated with the DetailSelectorID number 1, as already explained, in the first step to obtain the available GlueSelectorID Numbers 3, 7, 13, 14, 15. Call this the G1 set. Similarly, the DetailSelectorID number 11 is looked up in table 3 to give the chosen GlueSelectorID numbers as 9 and 14. The union set (the sum set) of Items associated with these GlueSelectors (because they are in the same Glue Group) can be found from table 5 as ItemIDs 1, 4, 9, 14, 15. The available GlueSelectors (determined by the DetailSelector, ID 11, from the person Glue Group only) is the set of GlueSelectors associated with these (1, 4, 9, 14, and 15) found Items. That set can be looked up in table 6 as the set: 1, 2, 3, 5, 6, 7, 9, 14, and 15. Call this the G2 set. The actual available GlueSelectors are the intersection of the two sets G1 and G2 which is the set: 3, 7, 14 and 15.

The available GlueSelectorIDs 3 and 7 are in the vehicle Glue Group, whereas the other two are in the person Glue Group. We are searching for all Items in which both the found people and the found vehicles are present. Both of the two found vehicles (actually two vehicle GlueSelectors IDs 3, and 7, but these represent two vehicles) satisfy the vehicle part of the query. Similarly both of the found people, IDs 14 and 15, satisfy the people part of the query. Therefore in both cases they are alternatives, so the disjunctive is used in evaluating the Items they find. But between the two GlueSelector disjunctive expressions in the different Glue Groups, we need a conjunctive (and) to determine the found Items.

Therefore to evaluate the found Items, the server finds the union set of Items associated with the two GlueSelectors 14 and 15 in the person Glue Group and takes its intersection with a similar union set of vehicles from the vehicle Glue Group, GlueSelector numbers 3 and 7. The first set can be determined from table 5 and is 4, 8, 14, 15, and the second set, also from table 5, is 5, 14, and 15. The intersection is therefore 14 and 15 and this is the found ItemID set. The Boolean query (internal to the server) which evaluates to the found Item is "(14 or 15) and (3 or 7)."

The available DetailSelectors are those associated with the available (in this case the chosen) GlueSelectors. Assuming all disjunctive Detail Groups, the DetailSelectors associated with DetailSelectors with GlueSelectors in the available set: 3, 7, 14, 15, can be found in table 4 as the set: 1, 7, 11, 12, and 15. The available Item Type or BareSelectors are those associated with the found Items namely just one, ID 16. Example 2 explains how to modify this calculation for the case of disjunctive Detail Groups.

FIG. 1, Example 2, First step: Search for a blue or green vehicle. This example illustrates the effect of Boolean properties of Detail Groups. The color Detail Group is again deemed disjunctive. All DetailSelector Groups have a Boolean property, as described in the '566 patent, the most common being disjunctive and conjunctive.

Disjunctive Groups. Multiple DetailSelectors chosen from a disjunctive Detail Group are joined together with the disjunction "or" when added to the query Boolean. That means that if more than one DetailSelector is chosen from a disjunctive Group, said detail Selectors are alternatives.

Conjunctive Groups. In a conjunctive Detail Group, multiple selectors chosen from the same Group are joined with the conjunction "and" when added to the query Boolean. That means that if more than one DetailSelector is chosen from a conjunctive Group, said detail Selectors must all be associated with the found GlueSelectors.

If only one DetailSelector is chosen from a Detail Group, the Boolean property does not influence how it is added to the query Boolean, because all DetailSelector Boolean expression parts from different Detail Groups are joined with the "and" conjunction.

Example 2, first step evaluation: The blue or green vehicle query, using DetailSelectorIDs is "1 or 3" The user chooses both DetailSelectors in a disjunctive color Group. The GlueSelectors found by this query, from table 3, are 2, 3, 4, and 7. This is obtained as the union set of those associated with 1 (3, 7) plus those associated with 3 (i.e., 2, 4). The next step includes calculating the matching Items, then the available GlueSelectors, leading to the available detail selectors, as in example 1. The ItemIDs associated with the found GlueSelectors are looked up in table 5, and, because all such GlueSelectors are in the same Glue Group, the associated ItemIDs include the union set of found Items, IDs 1, 2, 5, 10, 14 and 15.

The union set of all GlueSelectors associated with these Items are found from table 6 as 1, 2, 3, 4, 7, 9, 10, 13, 14, and 15. The actual available set of GlueSelectors within the same GlueSelector Group is the conjunction set of those thus identified, and those already picked in the vehicle Glue Group. This eliminates 1 from the list, leaving available GlueSelectors 2-4, 7, 9, 10 and 13-15. Finally the available DetailSelectors are all the DetailSelectors in the vehicle color Detail Group (because it is disjunctive) and those DetailSelectors associated with that subset of available GlueSelectors which are in the person Glue Group. That is the DetailSelector subset 9, 10 and 13-15. These associations are found in table 4 and -give the available DetailSelectors in the person Glue Group as the set of DetailSelectorIDs: 9-13 and 15. The available BareSelectors are all those associated with the found ItemIDs (1, 2, 5, 10, 14, 15), i.e., both 16 and 17.

Summary of result: Found Items: 1, 2, 5, 10, 14, 15; available DetailSelectors: 1-13 and 15 (only 14 is not available); available GlueSelectors: 2, 3, 4, 7, 9, 10, 13, 14, 15; available BareSelectors: 16, 17.

Example 2 Second Step: person associated with the blue or green vehicle weighs 162 lbs. The person's weight is added to the Item description. The complete query, using IDs, is: "(1 or 3) and 15." Parentheses are needed to ensure that the disjunctive (or) Boolean operation that applies to DetailSelectors 1 and 3 is evaluated before the conjunctive (and) operation.

Unless parentheses are used, the conjunctive operation has precedence over the disjunctive, yielding a very different result. The Detail Group parts of the query are evaluated separately for each Detail Group. The two parts of the query associated with separate Detail Groups are "1 or 3" and "15." The first query has been evaluated in the first part, and the result listed above, so the second part is evaluated next.

The GlueSelectors found by choosing the DetailSelectorID 15 are looked up in table 3. The found GlueSelectorIDs are 13, 14, and 15. Table 5 is used to find the associated ItemIDs: 4, 5, 8, 12, 13, 14, and 15. Call this set 11. The ItemID set found in the First Step from the DetailSelectors in the vehicle Glue Group is: 1, 2, 5, 10, 14, 15, and may be nominated set 12. The actual "found" set of ItemIDs is the intersection of these two sets, 11*12, or the found ItemIDs 14 and 15.

The following calculations demonstrate how the available DetailSelectors would be computed and those computed would be displayed in every conjunctive Detail Group to which they belong. A different calculation, which follows later, is needed to determine which DetailSelectors to show in the disjunctive Detail Groups.

Now the GlueSelectors associated with this found Item set are found from table 6. The ID set of these GlueSelectors is: 1, 3, 7, 14 and 15. Call this the G1 set. To find the available GlueSelectors in each Glue Group, evaluate the intersection of the set of chosen GlueSelectors in each set with G1. The found GlueSelectorIDs set in the vehicle Glue Group is 2, 3, 4 and 7, evaluated in the first step of this example. Its intersection with G1 is the set of IDs 3 and 7, which are the available GlueSelectors in the vehicle Glue Group. Similarly, the intersection of G1 with the found GlueSelectors in the person Glue Group (13, 14, and 15) is the set: 14, 15. Therefore these are the only two available GlueSelectors in the person Glue Group. The set of all available GlueSelectorIDs is therefore: 3, 7, 14 and 15. From this we lookup in table 4 the associated DetailSelectorIDs: 1, 7, 11, 12 and 15.

The available DetailSelectors in conjunctive Detail Groups, and in all Groups, whether conjunctive or disjunctive (the make and age Detail Groups in this example) which have not contributed any DetailSelectors to the Boolean query, have the IDs: 1, 7, 11, 12 and, 15. Although these are the only available DetailSelectors, more than these must be displayed in disjunctive Detail Groups. This is because such groups must display DetailSelectors which, although not associated with any currently available GlueSelectors, can be used to add GlueSelectors (and therefore Items) to the available set. They must be able to add these GlueSelectors, provided that adding them would not contradict the query Boolean part coming from another Detail Group. This means, as pointed out in patent 566, that we must evaluate a number of special queries, one for each disjunctive Detail Group contributing a DetailSelector to the Boolean query.

In this example we determine two sets of available Glue-Selectors: one assuming that only the color Group DetailSelectors were chosen. (This was done in the first part of this example.) This determines the available DetailSelectors in the person weight Detail Group. The other set assuming that only the DetailSelector from the person weight group was chosen, which determines the available set in the vehicle color Detail Group. The first set of GlueSelectors is 2, 3, 4, 7, 9, 10, 13, 14, 15 (from first part of example 2) but only 13, 14, 15 are in the Person Weight DetailSelector Group. Therefore the available DetailSelectors in the person weight Group are 13, 14, 15, which is all of them.

Next the Boolean query "15" must be evaluated to find the available GlueSelectors and hence the available detail Selectors in the vehicle color Detail Group. The GlueSelectorIDs associated with DetailSelectorID number 15 are (the found GlueSelectors) from table 3 are: 13, 14, and 15. Using table 5, the ItemIDs of the found Items are: 4, 5, 8, 12, 13, 14, and 15. Using table 6, these in turn give the following associated GlueSelectorIDs: 1, 3, 6, 7, 13, 14, and 15. The already found GlueSelectors in the person Glue Group (13, 14, and 15) do not limit this set in this case, so this is the available GlueSelector set for this query. It presently serves only to determine the available DetailSelectors in the vehicle color Detail Group, i.e., only those DetailSelectors associated with the GlueSelectorIDs 1 and 3. These DetailSelectorIDs, from table 4, are: 1, 2, 5, 7. Therefore the two DetailSelector Groups, the color and weight Groups, being both disjunctive will display the available DetailSelectors as 1, 2, and 13, 14, 15, respectively. Finally the only available BareSelector is ID 16, associated with Item 15 by table 8.

USING GLUE SELECTORS: In a structured relational database, comprised of person records, vehicle records, and incident records, an incident, which is an association of some, or all of such records, is an item of interest, called simply an Item. It is, in essence, the highest level GlueSelector in IM system nomenclature. It is like a Selector in that it usually does not contain any records per se, but rather references to the "comprised" records in essentially the same way that a Selector of the data contained in these records. It is named differently because it is defined as a data target, and of course does not select any higher-level entities, but in most regards it functions just like a GlueSelector.

An Incident may contain multiple person records and multiple vehicle records. The persons might, for example, be pedestrians, passengers, or drivers of specific vehicles. Connections between a particular vehicle and its driver or its passengers may be made through a linking field value, where the field value in a driver person record matches the value in a similar field in the vehicle record, thereby creating the association between the person driver and the vehicle.

One goal is to retain all the data associations intact when assigning the detailed descriptions of the people, the vehicles, and the incident events, all of which comprise an Item, to different locations. Another goal is to provide access to the context represented by such associations in the metadata, so that it can be provided to a user to assist with data searching and access.

Each DetailSelector describes a detail of each entity (an Item, or a Subitem within the Item, such as a Vehicle, that is described by all the elements of a GlueSelector of the appropriate Group). All DetailSelectors describing a particular driver may be combined into a Driver GlueSelector, which is typically a level-2 GlueSelector (DetailSelectors being level-1 Selectors). Similarly, all DetailSelectors describing the driven vehicle may be combined into a Vehicle GlueSelector, also at level-2. Then the Driver GlueSelector may be combined (or associated) with the Vehicle GlueSelector to create a next higher (level-3) GlueSelector, which may be associated with a descriptive name such as Vehicle/Driver (GlueSelector).

Other groups of DetailSelectors may be similarly combined or associated in a higher level GlueSelector. For example, family relationships between people in an Incident represented by level-2 Person GlueSelectors may be combined into level-3 Family GlueSelectors describing family members. Such level-3 GlueSelectors may then be linked to Items comprising all of the elements represented by such GlueSelectors.

GENERAL QUERY EVALUATION RULES: The following general query evaluation rules can be deduced from the examples set forth above.

Using the nomenclature that DetailSelectors are the same as zero level GlueSelectors and that Items are the highest level GlueSelectors, the level of a GlueSelector is defined implicitly through the definition of all GlueSelectors as follows: The Nth level GlueSelector is an entity comprised of the association of GlueSelectors (the Contained GlueSelectors) at lower levels, where at least one of said Contained GlueSelectors is at level N−1. This definition can be used recursively to generate all the levels of GlueSelectors needed for a particular data implementation.

Association links may be required to begin with a DetailSelector and end with one or more Items, or conversely to extend from an Item to one or more DetailSelectors. Each level of GlueSelectors is typically organized into Glue Groups, each Glue Group being associated with a facet of a data element, such as a DataItem or Subitem, with which it is ultimately associated. Items, the last GlueSelector level, may sometimes be usefully organized into Groups if non-overlapping types, classes or styles of Items are present. If only one group is needed then a BareSelector can associate the appropriate context. Thus, a BareSelector may be used and treated as a Group, and/or used to limit Items to particular types. Therefore, in many implementations Items are not grouped (i.e., they comprise a solitary group).

Beginning at DetailSelectors, and passing along association links through GlueSelectors at various levels (if present), ultimately each such DetailSelector leads to Items. Note that to reach suitably matching Items, a path from a DetailSelector may be required to be monotonically linked, such that the entire path can be followed traversing association links always in the same direction (always "up" to higher levels if from DetailSelector to Item, but the reverse path "down" is also monotonically linked). Such linking association "finds" or "selects" the Items in a manner dependent on the logical combinations of the chosen Selectors, called the "search query Boolean."

As described in the '566 patent, each DetailSelector Group has a Boolean property which determines the Boolean logical operator that is used with DetailSelectors chosen from said group. The two most common Boolean properties are disjunctive and conjunctive. Disjunctive Groups contribute DetailSelectors, to the query Boolean, with the disjunctive "OR," but the operator functions only between DetailSelectors from that Group. Similarly, conjunctive Groups contribute DetailSelectors to the query Boolean, with the conjunctive "AND" between DetailSelectors from that Group. Each Group's contribution is parenthesized and the results of these Group-associated expressions are then joined to other results using the conjunctive "AND" Boolean operator to yield the Boolean query. The following are query evaluation steps for the general case of an arbitrary number of GlueSelector levels.

1. Choose DetailSelectors: from their respective Detail Groups. A Boolean query, comprised of DetailSelectors and Boolean operators, most commonly the Conjunctive "AND" and the disjunctive "OR", is automatically created, as described in the '566 patent.

2. Evaluate Effect of BareSelectors: If part of the query, BareSelector effects are evaluated as in the '566 patent, where Selectors are associated directly with Items. Its effect is to limit the available Items (called "Filter Items") and through these the available GlueSelectors and then available DetailSelectors. These then form the starting point for the next steps, which search for GlueSelectors only amongst the available GlueSelectors (those associated with the Filter Items, called "Filter GlueSelectors") and for Items only within the Filter Items. If no BareSelectors are present, the Filter Items are all of the Items.

3. Evaluate Boolean Query Yielding Chosen GlueSelectors. This Boolean query selects (or filters, or chooses) GlueSelectors (one or more) from the Filter GlueSelectors. (These chosen GlueSelectors will be referred to as the chosen GlueSelectors.) The evaluation of these chosen GlueSelectors is first carried out separately for each Glue Group. Said evaluation, for each Glue Group, is generally as described in patent '566, except that the Items in that description are replaced in this case with GlueSelectors. Next, let the GlueSelector set chosen by this Boolean query evaluation for the $n^{th}$ Glue Group be given by $A_n=[g_{n,1}, g_{n,2}, \ldots g_{n,p_n}]$, where the 1, 2, 3, $\ldots p_n$ suffix counts the chosen GlueSelectors in Glue Group n.

4. Evaluate Matching Items. Using a Glue Query Boolean, evaluate the matching Items. This process is again similar to the first step except that now the GlueSelectors are used to Select the Items, whereas in the first step DetailSelectors were used to select GlueSelectors. Items are found by the chosen GlueSelectors through a Glue Query Boolean composed of the disjunctive of all the chosen GlueSelectors in each Glue Group, parenthesized and joined conjunctively. Symbolically (where "*"="AND" and "+"="OR") the Glue Query Boolean B is given by: $B=(g_{1,1}+g_{1,2}+ \ldots +g_{1,p_1})*(g_{2,1}+g_{2,2}+ \ldots +g_{2,p_2})*(g_{3,1}+g_{3,2}+ \ldots +g_{3,p_3})* \ldots$, where there is one parenthesized expression for each Glue Group from which a DetailSelector has been selected by the user and consequently, from which one or more GlueSelectors have been chosen. The matching set of Items is referred to here as $I=[i_1, i_2, i_3, i_4, \ldots ]$.

5. Evaluate Available GlueSelectors. Evaluation of the available GlueSelectors in each Glue Group may be described as two steps: (a) evaluate all GlueSelectors associated with any of the matching Items. Let that set of GlueSelectors be "A." Divide the A set into subsets, one for each Glue Group. Let $A_n$ be the subset of the A set of GlueSelectors in Glue Group n. (b) Then the available GlueSelectors in Glue Group n are the sets: (b)(i) $A_n$ for all Glue Groups n in which there are no chosen GlueSelectors, and (b)(ii) the chosen GlueSelector set in all Glue Groups which have at least one chosen GlueSelector.

6. Calculate Available DetailSelectors. DetailSelectors which are associated, which sometimes implies monotonically linked, with any of the available GlueSelectors. The set of available DetailSelectors is the union of all sets of DetailSelectors associated with each available GlueSelector. Calculation of such associations is done the same way the available Selectors are calculated for the system described in patent '566.

SELECTOR IDENTITY SPLITTING: When Selectors are associated with, or describe, N Subentities in a single Item, an additional Subentity Identifier may be assigned to each such Selector name, thereby providing the association between a Selector and a Subentity by uniquely identifying which of the plurality of Subentities in the Item it is associated with. A Subentity Identifier may be a simple counter added to the name. Because it is an identifier of Subentities within an Item, and not outside the item, the number of such Subentity Identifiers is limited in each Item to the number of Subentities within the Item.

Selectors in another Item can re-use the same Subentity Identifiers without causing confusion, because there is no data ambiguity between Selectors in different Items. The counter re-starts for each selector name. Globally, therefore, each Selector may be split into a number of Subentity Identifier Modified Selectors (SIMS). The number of them is the maximum number of relevant Subentities in any Item with which the Selector is associated. Each of these Modified Selectors is assigned a separate and unique ID number, as with all other Selectors.

Analysis of a target database may reveal that in any Incident Item the largest number of different vehicles is 10. Splitting each Selector describing a vehicle into 10, each describing the same attribute but of a different vehicle within an Item, is sufficient to resolve the potential ambiguity. While most Items would not need all 10 SIMS, each vehicle attribute would be multiplied by 10 to ensure that the ItemSelector list covers all possible assignments to Items, producing 10 different instances of the same descriptive Selector in the ItemSelector list. Consistent with the foregoing, 10 instances of each color would be generated in the Selector Group of vehicle colors. The 10 DetailSelectors describing the Black color, for example, would include: Black 1, Black 2, Black 3, . . . , Black 10. As Selectors are assigned to Items, the first Black vehicle in an Item may be assigned the Selector "Black 1," the second black vehicle, the Selector "Black 2," and so on.

Furthermore, each character in the license plate of the first vehicle would have the "1" identifier, as would each other vehicle Selector (DetailSelectors such as model, make, style, etc., or GlueSelectors). All attributes of the first vehicle will have the "1" identifier attached to each associated Selector; and all Selectors associated with the second vehicle in the Item will have the "2" identifier, etc. This permits proper association of all vehicle-descriptive Selectors with each appropriate vehicle. A need for a considerably larger number of Selectors is a cost of implementing this particular solution to the relevant data ambiguity problem.

The user need see and be allowed to choose only one instance of each Selector (e.g., color Black, or characters in the license plate) at a time, because the user is not concerned with "which" vehicle in an item the license plate is associated, but only that a vehicle has all of the details that belong to it. When a user selects the first Selector of a vehicle description, the enabling software (e.g., the client of a client-server system) will prepare a Boolean query to the server that is a disjunctive of all the possible identifier versions of that Selector, so they become selectable alternatives in the query.

Thus, if a user chooses the Selector "Black," for example, the Boolean query B1 sent to the server would be given by: B1=Black 1 OR Black 2 OR Black 3 OR . . . OR Black 10. At the time of creating this query, the available Selectors may be checked, and the list of disjunctives may be reduced by indicating only the available Selectors. If a user then further selects the make of the vehicle as "Ford" (if in the list of available Selectors), the Boolean query B2 sent to the server would be: B2=Black 1 AND Ford 1 OR Black 2 AND Ford 2 OR Black 3 AND Ford 3 OR . . . OR Black 10 AND Ford 10 (omitting the unavailable Selectors). In general, the Boolean query describing an Item comprises conjunctive terms, joined together with the disjunctive, such that each conjunctive term comprises all chosen Selectors which have the same Subentity Identifier.

Following the first query (represented by the Boolean B1), it is possible that some of the Ford instances are not available. Consequently, the disjunctive list of "Black AND Ford" terms in the Boolean B2 generally need not have the maximum number of 10.

During the process of associating Selectors to Items and creating the metadata storing such associations (called "Tagging"), the Tagger software checks the fields of a record describing an Item and assigns appropriate Selectors, including ensuring that the same Subentity Identifier is used with all attributes associated with a particular Subentity (e.g., vehicle, person, location etc). In one form of the implementation of a structured database, the Tagger reads data in units of records, and hence can easily assign the same Subentity Identifier to all Selectors coming from a single record. This is sufficient to resolve data ambiguities.

SERVER SIDE LINKING: Linking, in this context, is a process of combining individual associated records, or in general data elements, into Items. Such combining, in traditional structured databases, is based on linking fields. In unstructured data, the link can be an offset Into the file or a specific word, symbol, graphic, etc., or a combination of these. In any database linking can be based on any parameter associated with, or present in the data. (In traditional, classic databases the linked Items are similar, but not the same as "joins.")

In one implementation of structured data in an IM system database the linking is performed symbolically. Each record is referenced through an offset into a file of records so it can be uniquely identified by a file name and an offset. The link file defines each item as a list of the references to the linked records comprising the item, and saves these references in a link file. This is normally done as part of the pre-processing of data while implementing the IM system database. Following linking, the Tagger may be used to create the Selector lists and their associations to Items.

The special case in which each record is an unlinked Item does not normally exhibit any data ambiguity problems, because each record usually describes only one entity, object or event. It is only those Items that comprise linked records which contain data about more than one instance of a Subentity (such as more than one person or more than one vehicle etc.) that exhibit this particular ambiguity problem. Therefore, if linking is not performed, there will be no data ambiguity.

In an unlinked system, there may be a plurality of record types, each type containing a description of a different entity. For example, there may be person description records, vehicle description records, event description records, and so on. However, linking allows the user to discover cross-associations between descriptions of different Subentities in an Item such as an event. To enable such cross associations, the linking process may be performed in real time, during the evaluation of a query. The individuality of Subentities may be maintained during searching, while the cross-associations between Subentities can be simultaneously accounted for, by executing the steps of the search in the appropriate order. This avoids any data ambiguity.

Consider a user seeking a vehicle and a person involved in an incident. First, all the vehicle records that suitably match the description of a vehicle are found; call this Item Set 1. A link table, which may be called an Item-to-Item Matrix or IIM, was previously created, and associates Items to Items in a manner similar to the Matrix of associations between Items and Selectors. (There may be sufficient information in the usual Item-to-Selectors vector arrays to either use it in place of the IIM, or to create an IIM at startup.)

Special Selectors may be defined to link individual Items. When one Item has an identical value of the linking Selector as another, they are linked, because both will be found when such value of the Selector is invoked in a query. Such Selectors may be used in place of an IIM, or in addition thereto, to link Items. The following assumes that such Item-linking Selectors have been implemented, and will be used in evaluating queries.

In a typical IM system query evaluation process, as described in both the 360 and the 566 patents, an evaluation of a Boolean query comprised of Boolean operators and Selectors will produce a result consisting of two parts: the found Items, and the remaining available Selectors. Both are typically located via their ID numbers.

Server Side Linking generally requires several steps to obtain a query result. The first few steps require only the available Selectors, and only the final step also requires the found Items. It may be implemented as follows:

First, break up the query Boolean into Boolean Components, each of which is comprised of Selectors describing only one type of Item (e.g., person description Items). For each of the Boolean components (B1 . . . BN, each associated with an Item type), evaluate the set of available Selectors which are members of the linking Selectors set. Call this set the Found Linking Selectors. Next, evaluate the intersection set between lists of the Found Linking Selectors sets, i.e., find those linking Selectors that are present in all of the component sets. Call this the Final Linking Selector set with components labeled L1, L2, . . . Ln. Next, find all the Items associated with the Final Linking Set of Selectors. These Items, and the associated available Selectors, are the standard results of evaluating the Boolean query: L1+L2+L3 . . . +Ln. Finally, upon user request to view a found Item set, determine all other Items linked to the associated Items, and return that set of Items. The associated Items may be found by either using the IIM, or by evaluating the query which finds all Items with the linking Selector values in the found Item set.

CONTEXT: USING GROUPS TO REDUCE AMBIGUITY. An IM system may assist a user constructing a query by providing alternative contexts in which a particular DetailSelector might be found. After choosing an available Selector, an IM system may determine each Group of which the Selector, or a synonym of the Selector, is a member. Each such different Group provides a different context in which the Selector is found in the IM system. The context may be presented to the user to help the user select the most relevant meaning of the chosen Selector, as reflected by the description of a Selector Group that comprises it. Context may also be gleaned from the other DetailSelectors that are also referenced by a GlueSelector that references the chosen DetailSelector.

Facet Augmented Contextual Terms Search (FACTS) is a method and system for performing a search for Items in a database. It may comprise some or all of the following program and user steps, performed in any convenient order. A Program enables a user to input the target which comprises user identification of sought Items. User choice may be broken down into smaller steps by, for example, enabling user to build a Target description from smaller description elements, such as words, characters, icons, etc. Commonly, user input is accomplished by typing text on a keyboard, but in some implementations, user input can be by mouse click (or touching sensitive screen or pad), by voice, by gesture, or by other means examples of which are described in the definition of a selector. Said target is matched in some definable way to the available Selectors and the user confirms or modifies the choice of the match of Selectors.

The Program may identify the Matching Context Set using a Target description, or partial Target description, if available. The Matching Context Set is a set of Item type descriptions or facets of all possible Items, limited to those matching the chosen Selector, or Selectors Boolean, if one has been entered and may be represented by text, graphics, sounds, videos, combinations of these, or using any media conveying identification of the Items.

Enable the user to choose desired contexts (one or more) from amongst the Matching Context Set. Various possible methods of enabling user choices parallel those exemplified in the definition of selectors. User choice may be broken down into smaller steps, for example, by enabling user to build a context description from a vocabulary of smaller description elements, such as words, characters, icons, etc.

Enable the user to choose to make their choice of the desired context either more specific either, or said Target description, or both. Optionally, on request at any of the above steps, communicate to the user the number of Item hits. Such a communication is typically a text display showing their number, but could also include voice notification, or notification by any other means, such as for example displaying the Item names in a list, showing the number on a scale, etc.

Also optionally, on request at any of the above steps, enable user access to the matching Items. A simple and intuitive way for a human user to indicate a request for Item access is a double-click on a representation of the Item, or a group of Items, but many other equivalent means are possible as exemplified in the definitions of Accessing Items. Automated access may be a user set preference and may be suppressed until the number of matching Items is no greater than some predefined number.

All, or some of the steps may be repeated at user's choice. Usually the user will determine when the number of matching Items is sufficiently small for them to be accessed. Alternative paths are available after the alternate connected specifications of the Target and the context have been enabled, permitting many possible applications of FACTS. An example is to use FACTS to find the right path to the Target in a data collection organized in a hierarchical file tree structure, or using some other taxonomy.

Using FACTS to Search Hierarchical and other Taxonomies: When using FACTS as a method of finding the path to the Target in an organized set of data subsets (folders) whether organized hierarchically or not, the following is a possible procedure.

Definition of Folder. The word folder in this document, should be understood more generally than the computer disk folder interpretation. In general the folder is used here to represent an identifier of a storage system containing a subset of Items.

For the special case of a hierarchical organization of folders, like the special folders of the computer disk system, the most inclusive are the top level and the least inclusive the lowest level of the hierarchy. This arrangement of folders is used to illustrate how the FACTS system can be used to facilitate search navigation through the folders in finding Items. Any similar arrangement of folders, could be used equally well as an example. In non-hierarchical applications, it may be desirable to specify some ordered groupings of folders to replace the "levels" of a hierarchy and when no such groupings are used, all folders are treated as being at one level of a hierarchy.

The following actions comprise an example of a process using FACTS to navigate a search through a structured organization of folders containing Items.

1. Enable user to input the Target description which comprises user identification of the Target.
2. Using said Target description, partial or complete, limited by any previous Target Paths Set (said limit applies only on second and subsequent visits of this step) identify the associated new Target Paths Set. Said Target Paths Set is determined according to some rules which rules may be adjustable by the user. One example of Target Paths Set is defined according to the following rules:

The Root Target Folder set is the set of lowest level folders, each of which contains all Items matching said Target (usually there will be just one such folder). The Leaf Target Folder set is the set of lowest level folders, optionally constrained by an adjustable lower bound, each of which contains at least one of the matching Targets. The set of possible paths from each Root Target Folder to each associated Leaf Target Folder, in this example, forms the Target Paths Set.
3. Enable user to choose from the Target Paths Set any one or more paths.
4. User may choose the relevant path, or paths (or their description) from the Target Paths Set, or may go back to step 2, to add another input element to said Target description to narrow down the Target Paths Set further before making the choice.
5. If user chooses a path or paths from the Target Paths Set, and said chosen paths end in leaves which are not at the lowest level of the hierarchical tree the next lower-level Target Paths Set may be made available for user to choose further, or the matching Items may be made available to the user, or both.

An illustrative example follows. If a user types the word brown as the start of the description or name of the search target, FACTS would respond with a listing of Facets (contexts) some of which might be:
Color
Name Building Name Institution Non-profit
Name City or County Name Monument
Name Corporation For-profit Name Person
Name Institution Educational Web Domain
Many facets could be listed, even reaching to hundreds of thousands, or even more.

The user may choose a relevant facet or context for the existing query, or to add another word to brown, as for example university. Thereupon, an IM system incorporating FACTS features would immediately narrow the list of relevant contextual facets, and optionally display relevant Item hits and/or their quantity. If the number of possible facets is large, choosing them from a list is not convenient. Fortunately, there are many easier alternatives. One such alternative is to use the methods described in U.S. Pat. No. 5,544,360 (the '360) as follows.

Each of a large number of facets is regarded as a "file" (as in the '360). The facets are broken down into individual words, and the vocabulary of these words is the list of Categories (term from '360) from which a user chooses a combination which isolates one or a few facets. After each word from said vocabulary is chosen, only the associated words remain displayed as options for narrowing the choice of facet. In this way a user is guided to the available contexts (facets) with no need to know an order of words describing particular facets.

A further alternative is to group facets into more general groups, with possible overlaps, i.e., facets that belong to more than one group. The description of each such group then becomes a higher level facet. With a suitable arrangement of the groupings, the number of these higher level facets can be much lower than the total number of facets, reducing the complexity of the user choice. There are numerous alternative interfaces and detailed implementations of FACTS, as illustrated in examples set forth below.

Searching a very large database using TIE (Technology for Information Engineering U.S. Pat. Nos. 5,544,360 and 6,826,566) or IM systems generally uses displays of many lists of Selectors organized into facet groups. Whereas this has many advantages for users, allowing them to see what terms are available, which data Items are related etc., it does have the disadvantage of overwhelming some users with many lists.

Furthermore in many client-server applications the client needs to be a Java application or applet and sometimes needs to have a lot of data downloaded from the server. For low bandwidth situations, it would be convenient to have a very simple interface for a very light client.

Many users are used to various search engines on the web, most of which begin with a text entry box and nothing much else. Only after users enter something do they expect to see lists. Therefore a minimalist approach to an interface, whilst preserving the power and features of a TIE search, is desirable. The following describes such an example and introduces some new context related features.

In the following example, the user initially sees only a single text entry box, as with most current search engines on the web. A user begins to type, and at some point (which may be user configurable, or adjustable by rule) the first list of Selectors is displayed which matches, in some definable approximation, user typed text. Examples of some possible rules for displaying selectors: the Selectors need not be displayed until the user completes the typed entry, or may begin to be displayed after a certain number of characters are typed, or may be displayed when the number of possible matching selectors is less than some upper limit. Thereupon, a first Selector list displayed. This first list may be arranged to be reasonably short, through the definition of the approximate match, or some other way. Several methods can be used to make sure that the list presented to the user is never very long and that only the lists needed are displayed. Next, the user chooses a Selector. The user may indicate completion of text entry by various means, one of which could be the mouse selection of a Selector from the displayed list. Another common method is to type the Enter key.

At this point, contexts are displayed. If the chosen Selector exists in (i.e. is associated with) one or more contexts, the associated contexts are displayed as facets for user to choose from. The list may be broken down into and individual word vocabulary, as described above. A text box for text entry opens next to the context facet list, and the method of selecting a facet can parallel the method of selecting a Selector. Similarly the list of Facets, if it is long, need not be displayed completely and may be narrowed after each typed character. Alternatively, the user may be given a choice of seeing even a long list of contextual facets or their vocabularies.

For example, this list of associated contextual facets might be displayed after a user enters "Ford":
1. Address
2. City
3. County
4. Name of Person or Company
5. Other Location, or Building Name
6. Vehicle Make Before proceeding further, the user may be required to choose a facet from the list, or may be provided them to choose from at user's option. Once a facet is chosen, additional text may be entered so that narrowing of the matching Items proceeds. More detailed contextual facets may be offered for user selection during this process.

In the following example, assume the user chose the facet "Name of Person or Company." Thereupon the remaining facets could be updated to more detailed options, such as:
1. Manufacturing
2. . . .
3. Foundation
4. . . .
5. Sales
6. . . .

listing all of the types of companies that have Ford in their name.

Now the user can choose one of these types (for example "Foundation") from the facet list, or add text to the original name Ford, such as for example "Ford Fellowship" adding "Fellowship" to the name, or do both, to narrow down the still large list of Items that match the search. In general, the user can now continue the narrowing through either a choice of the context facets or by adding to the target search text. To help the user make appropriate choices to add to the target search FACTS can display the available additional selectors describing the target, allowing the user to choose from amongst these and simultaneously choose from amongst the available associated contexts.

Implementations may be dictated by the available hardware. Software to control performance of the features described above can be implemented many different ways. For very large databases, it is currently desirable to use special data structures and procedures to reduce the response time of the various features to satisfactory levels of latency. However, increasing processing power and data transfer speeds will obviate a need for specialized hardware and data organization, allowing the simplest and most direct implementations to be quite practical. With current technology for limited database sizes, a simple direct approach will suffice. However, it is also likely that with the explosion of data available will match or exceed increases in processing speed, such that very large databases will continue to benefit from special hardware and/or data structure optimizations.

For example, when a user enters a word that has to be found in an ordered list of about a million words, the direct, simplest method is a linear search through the list of words. This search on most modern computers will take only a fraction of a second and so is usually quite acceptable. At a very slight additional effort in programming, the search can be made binary. At a further slight increase in effort, the list may be stored in a special tree structure called a Trie, both speeding access and reducing storage space requirements. Other methods of storing data for quick access using list storage and hashed storage are possible and described in standard programming books and publications.

The basic programming functions needed in implementing the FACTS system involve data structures which store associations between selectors (S) and Items (I) and Selectors and contextual Groups (G). This is not a three-way association because once the S-G and the S-I associations have been decided, no further freedom is available. The G-I associations are entirely through the Selectors. Therefore these associations can be represented either by a single association matrix, or by two such matrices. The association storage and access may be Implemented numerous ways. Two examples of such implementation are set forth below.

The first example requires each Selector to have exclusive membership in a contextual Group, and will be called the Exclusive Membership method. According to this method, no Selector can belong to more than one Group. This method may be implemented using techniques described for implementing the TIE system, with only a change of the interface on the client of a client-server system. The method can store all the associations in a single matrix (although for speed of access, the single matrix information is often stored twice, in a double matrix, in two different forms). The second method uses two matrix (or equivalent) sets, one set for the S-G associations, the other for the S-I associations. This we refer to as the Inclusive Membership method, because every Selector can belong to any number of groups.

Following an Exclusive Membership Method, each Selector description which has multiple contexts is represented by a different ID and so a different Selector, even though such different Selectors may each be displayed to the user in the same way, such as using the same name.

For example, if we use the word Ford as a Selector, as in the previously described example (see p 6 above) we see that it can have many contexts, i.e, it can be associated with several contextual Groups. Each group association would assign to Ford a different unique identifier (usually an ID number) but the display of all Selectors in a FACTS implementation need only display Ford once. This implies that when a user chooses a Selector, an IM system employing FACTS features must determine all the SelectorIDs that identify the same display of the Selector. Then using these IDs, determine the available contextual Groups of each (availability determined by the subset of Items already narrowed) and display these.

Typically, the association of Selector names to their IDs may be stored in a Trie1 with each node storing the SelectorID for quick access using the characters in each Selector name as branches allowing quick partial or total matches to typed text, as is customary in present programming practice. For the look-up using the ID, the table can be an array with the array index being the SelectorID and the value being the Selector name, or a pointer to it. Membership of a particular SelectorID in a Group can be determined by arranging distinct continuous SelectorID ranges for Selectors in each Group. This means that given a SelectorID, we determine its Group membership by any of the standard methods used to search range membership in a sorted list. The following describes some possible methods.

The simplest, but not highly efficient, method is a linear search through all the range starting values in order from the first Group starting value (usually 1). When the starting value exceeds the ID of the Selector, the Selector must belong to the Group with the previous starting value.

The next simplest uses a binary search. For this the starting value of the middle Group is checked. If the SelectorID is larger than that value, the middle of the first half set of Groups is checked; if it is lower, than the starting value, the middle of the second set of Groups is checked. This is repeated recursively, dividing each group set in two until the Group is found. Therefore all we need is a version of the usual association matrix, in which the Selectors are represented on one axis and the Items on the other axis. Implementations of this in code have been described elsewhere.

One important point needs to be made when using the Exclusive Membership method. When the same Selector (i.e., Selector name) belongs to several groups, its membership in each Group gives rise to a different Selector identifier, even though its name remains the same. This is necessary to have a tight association between Groups and Selectors and not introduce data ambiguity by trying to use the individual association of a Group and a Selector with an Item to imply the association between the Group and the Selector.

There are several ways to distinguish between Groups and Selectors, yet maintain a tight association between Selectors and Groups. One simple way is to allocate two separate (preferably non-overlapping) ID number ranges, one for the Selectors the other for the Groups. Once the ID is known, the range its value falls within determines whether it is a Selector or a Group. So for example, if the total number of Selectors is known to be less than 10 million, we could allocate Selectors to IDs below 10 million and Groups to IDs above 10 million.

The Inclusive Membership method allows any Selector to be associated with any number of Groups. The association matrix of Selector's to Groups (equivalent to membership of Selectors in Groups), when using the Inclusive Membership method can be stored in a separate matrix on the same server as the Selectors to Items matrix, or separately, serviced by a separate Context Guidance server. Such association between Selectors and Groups, on the one hand, and Items on the other, may be stored in many different ways. One way, using a binary Matrix representation as described in detail in the '360 patent, is to imagine a binary matrix where each non-zero element M(sg_id,i_id) associates the Selector with sg_id as identifier (or sg_id could be a Group identifier, depending on the identifier's value) to the Item with identifier i_id. This matrix is the same two-dimensional binary matrix representation described in the '360 patent and the TIE paper where details of possible implementations, including an implementation using vector arrays, are described.

For very large vocabularies of Selectors and a large number of Groups, special implementations described and others not described may be needed to make the list of Groups appear and narrow quickly. For other numbers, simpler, more direct implementations, including linear, or tree searches through ordered lists, may be quite adequate.

Set forth below are steps, and a type of data access, that permit implementation of a Minimalist Example. A user begins to type the target text, and all matching Selectors are displayed (using linear search through the list of all Selectors, or a tree search through a Trie structure). After the user chooses a Selector, an IM system incorporating FACTS features may perform the following tasks: 1) Calculate the matching Items; 2) Calculate the remaining available Selectors; and 3) Calculate the contextual Groups associated with all the available Selectors and display the contextual facets, or Group names.

Software design and implementation of the first two steps is known, so it will not be described here. When one Selector or more is chosen in a Boolean expression, the resulting Item hits, or associated Items, may be evaluated according to the usual rules. The Selectors associated with these Items (the available Selectors) are evaluated as described in the '566 and '360 references, as well as above with respect to IM systems generally.

Once the available selectors are known, the third step is to evaluate the list of contextual Groups associated with said available Selectors. This can be done various ways, depending on how Selector to Group associations are stored. For example, each available Selector may be checked for its association with Groups. The union set of all Groups associated with one or more of the available Selectors is the desired result of the third step.

For very large databases, such as the internet, the number of contextual Groups can be very large. In those cases it may be convenient to hierarchically organize these Groups. In such a hierarchical organization of Groups, there are several possible procedures and rules for displaying the contextual Group listings when a user chooses Selectors. For example, the top level could have the following hierarchical taxonomy:
1. People
 a. Name
 b. Address
 c. Country
 d. City
 e. Postal Code
 f. Height
 g. Weight
 h. Nationality
 i. More Details
2. Other Life
 j. Animals
 k. Bugs
 l. Plants
 m. Sea Creatures
3. Places Real & Virtual
 n. Country
 o. State
 p. City
 q. Address
 r. URL
 s. Building or Location Name
 t. etc.
4. Things Inanimate
 u. Books
 v. Computers
 w. Electrical Goods
 x. Other products
 y. Real State
 z. Software
 aa. Vehicles
5. Events
 bb. Storms Earthquakes
 cc. Political
 dd. Economic
 ee. Sports
6. Dates (Birth, Death, Event)
 ff. Year
 gg. Month
 hh. Day
 ll. Day-of-Week
7. Document Contents
 jj. Words
 kk. Numbers (Age, Elapsed Time, Phone Numbers, Money, Length, Height, Weight, Electrical)
 ll. Dates & Times
 mm. Graphics The listing of the associated Selector Groups would be under each appropriate heading.

When a user completes typing a word, each portion of the hierarchy of the top level taxonomy which contains such a word as part of its vocabulary may be displayed for the user to choose. The user may then choose the next word to add to the first word to reduce the quantity of hits. Eventually, the increasing query terms will sufficiently narrow the list of suitably matching Items until the list is convenient for the user to view.

This system is essentially a combination of the old hierarchical taxonomy with TIE or IM vocabulary based queries. Whereas a state-of-the-art taxonomy based search organizes the Items into the hierarchical tree, an IM system with FACTS features may use the hierarchical taxonomy to organize the vocabulary. Such vocabulary organization gives each word a context. As a term is entered, all possible contexts are displayed as user choices.

CONCLUSION

The foregoing description illustrates exemplary implementations, and novel features, of a method or system that facilitates browsing, searching and organization of data that need not be hierarchically stored. While the above description has pointed out novel features of the invention as applied to various embodiments, the skilled person will understand that various omissions, substitutions, and changes in the form and details of the methods and systems illustrated may be made without departing from the scope of the invention.

Each practical and novel combination of the elements described hereinabove, and each practical combination of equivalents to such elements, is contemplated as an embodiment of the invention. Because many more element combinations are contemplated as embodiments of the invention than can reasonably be enumerated explicitly herein, the scope of the invention is properly defined only by the appended claims, rather than by the foregoing description. All variations coming within the meaning and range of equivalency of the various claim elements are embraced within the scope of the corresponding claim.

We claim:

1. A method of generating explicitly associated metadata about a data collection to facilitate subsequent access to information in the data collection, the method comprising:
  a) identifying Information Details within the data collection, and for each of the Information Details generating a DetailSelector that references such Information Detail, all DetailSelectors being Level-1 Selectors;
  b) identifying a particular multiplicity of the Information Details that are contextually related due to each being descriptive of a common Subitem, and generating an association link from each DetailSelector corresponding to the related Information Details to a Level-2 GlueSelector that thereby reflects the contextual relationship between the particular multiplicity of Information Details;
  c) generating any number of Level-N GlueSelectors, N>1, each comprising association links directly between such Level-N GlueSelector and one or more lower level Selectors that are contextually related due to each being descriptive of another common Subitem;
  d) generating an association link between a particular GlueSelector of Level >1 and an ItemID corresponding to a DataItem, where the DataItem
    i) is a set of related data within the data collection, and
    ii) includes Information Details suitably matching the contextual meaning represented by the particular GlueSelector;
  e) wherein, using standard Graph Theory terminology, the association links together with the Selectors and Items they associate can be represented as a K-partite simple Graph ("the Associations Graph") having at least one cycle, in which each partite set contains all vertices representing a solitary level of Selectors or Items, each association link between Selectors and different Selectors or Items is a Graph Edge, and Items are of Level K, the highest Selector level plus one.

2. The method of claim 1, further comprising accepting a user input as indicating a particular set of Selectors within the metadata as terms of a search query, and responsively indicating to the user, as a choice for a further query term, a further Selector of the metadata that is associated with at least one same Item as is associated with the particular set of Selectors.

3. The method of claim 2, wherein the Selectors of the particular set are DetailSelectors, further comprising evaluating the search query by acts including:
  a) dividing the particular set of DetailSelectors into particular subsets each consisting of all DetailSelectors from one Detail Group;
  b) identifying, as chosen Selector sets, all Selectors of Levels greater than 1 that have direct association links to each of the particular DetailSelectors from each particular subset;
  c) responsive to the query, using set operations on the chosen Selector subsets to determine the next Level of Selectors or DataItems having a direct association link to Selectors from the chosen Selector sets, and deeming such next Level Selectors or DataItems to be chosen as a result; and
  d) if a non-empty chosen Selector set results from (c), then repeating steps (b) and (c), replacing in (b) the particular DetailSelectors by the chosen Selector Sets resulting from (c) until all found DataItems are determined.

4. The method of claim 3, further determining all available Selectors at any Level by acts including:
  a) identifying, as an associated Selector set at level K-1, all Selectors that have a direct association link to any found DataItem;
  b) dividing the associated Selector set into associated Selector subsets each consisting of all associated Selectors in one GlueGroup;
  c) determine the available Selectors at a particular Level using the associated Selector subsets at the particular Level and the chosen Selector sets at the same Level.

5. The method of claim 1, wherein Information Details suitably matching the contextual meaning represented by the particular GlueSelector comprise at least one Information Detail referenced by each DetailSelector monotonically linked to the particular GlueSelector, as modified in accordance with any Boolean property associated with a Group of which any such DetailSelector is a member.

6. The method of claim 4, further comprising generating a GlueSelector(N), N>2, in accordance with the steps 1(c).

7. The method of claim 6, further comprising generating a BareSelector that is a DetailSelector and includes association links to a plurality of Items.

8. The method of claim 1, further comprising (f) associating a plurality of Selectors as members of a SelectorGroup that reflects a common context of all member Selectors, and associating the SelectorGroup with a descriptive name that reflects such common context.

9. A method of using metadata about a data collection to facilitate access to DataItems within such collection, where DataItems are predefined entities comprising a plurality of associated constituent DataDetails, and wherein the metadata includes:
  a) DetailSelectors that are Level-1 Selectors and each reference at least one particular Information Detail within the data collection;
  b) Level-N GlueSelectors for at least one value of N, each
    i) having a representative GlueID and comprising association links between such GlueSelector and a plurality of lower-level Selectors,
    ii) linked to, and representing, all DetailSelectors that are represented by such lower-level Selectors or have an association link to such Level-N GlueSelector, wherein all such represented DetailSelectors are contextually related due to describing a same Subitem within a DataItem;
  c) a plurality of Items that each reference a corresponding DataItem and comprise indications of association links to one or more GlueSelectors of any level, thereby reflecting that the DataItem comprises Information Details suitably matching those represented by the one or more GlueSelectors;
  d) wherein, using standard Graph Theory terminology, the association links together with the Selectors and Items they associate can be represented as a K-partite simple Graph having at least one cycle, in which each partite set consists of all vertices representing a solitary level of Selectors or Items, each association link between Selectors and different Selectors or Items is a Graph Edge, and K is the level of Items and is one plus the highest Selector level;

the method comprising:

A) accepting as a term for a search query a user indication of an Information Detail within the data collection;

B) responsively determining, by means of the metadata, a set of further Information Details which, if added to terms currently selected for a search query, would form a new search query that suitably matches at least one predefined DataItem within the data collection; and C) indicating to the user at least some of such further Information Details as available choices to add to the currently selected terms to form a new search query.

10. The method of claim 9, further comprising:

D) accepting input from a user that suitably indicates a DetailSelector; and

E) responsively indicating to the user a plurality of different selectable contexts of the data collection that contain an Information Detail, or a synonym thereof, corresponding to the DetailSelector, each context indicated as a name descriptive of a unifying concept of a DetailSelector Group of which such DetailSelector is a member.

11. The method of claim 10, further comprising:

F) accepting input from a user that suitably indicates a DetailSelector; and

G) responsively indicating to the user a plurality of different selectable contexts of the data collection that contain an Information Detail, or a synonym thereof, corresponding to the DetailSelector, by indicating, as selectable contexts, different unifying concepts of corresponding different Groups of GlueSelectors that each comprise a GlueSelector associated with the user-indicated DetailSelector.

12. The method of claim 11, wherein an Information Detail suitably matches a DetailSelector by being substantially identical to an Information Detail represented by the DetailSelector.

13. The method of claim 12, wherein an Information Detail suitably matches a DetailSelector representing an associatively linked Information Detail by being a synonym of such linked Information Detail, by including a synonym of a portion of such linked Information Detail, or by being within a range indicated by such linked Information Detail.

14. The method of claim 13, wherein the GlueSelectors defined by element (c) include GlueSelectors of Level-N for a plurality of different values of N.

15. The method of claim 14, wherein the metadata includes a BareSelector that is a DetailSelector and comprises association links to a plurality of DataItems.

16. The method of claim 15 claim, wherein a particular file of the target data collection comprises a plurality of different DataItems.

17. The method of claim 16 claim, wherein a DataItem comprises data disposed in a plurality of different files of the target data collection.

18. The method of claim 17 claim, wherein a DataItem is coextensive with a file of the target data collection.

19. The method of claim 18 claim, wherein Information Details referenced by corresponding DetailSelectors are stored as fields of structured database records and DataItems are predetermined associations of said records.

20. The method of claim 19, wherein such representative Graph includes no triangles.

21. The method of claim 20, wherein Selectors accepted as chosen by a user to be terms of a query also convey a Boolean query logical operator affecting such query.

22. A method according to claim 21 wherein said Boolean query logical operators are determined by DetailSelector Group membership of each chosen Selector.

23. A computing system including memory and a processor that is configured to perform all of the steps of claim 9.

24. A computing system, including memory and a processor, that is configured to perform all of the steps of claim 22, and which is further configured to determine association links from a particular GlueSelector to higher-level entities by means of entries in a first lookup table, and to determine association links from the particular GlueSelector to lower-level Selectors by means of entries in a different second lookup table.

25. The method of claim 5, further comprising generating a GlueSelector(N), N>2, in accordance with the optional steps 1(c); generating a BareSelector that is a DetailSelector and includes association links to a plurality of Items; and (f) associating a plurality of Selectors as members of a SelectorGroup that reflects a common context of all member Selectors, and associating the SelectorGroup with a descriptive name that reflects such common context.

* * * * *